(12) United States Patent
Brunel

(10) Patent No.: US 12,155,435 B2
(45) Date of Patent: *Nov. 26, 2024

(54) BEAMFORMING COMMUNICATION SYSTEMS WITH SENSOR AIDED BEAM MANAGEMENT

(71) Applicant: Skyworks Solutions, Inc., Irvine, CA (US)

(72) Inventor: Dominique Michel Yves Brunel, Antibes (FR)

(73) Assignee: Skyworks Solutions, Inc., Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/482,925

(22) Filed: Sep. 23, 2021

(65) Prior Publication Data

US 2022/0014247 A1    Jan. 13, 2022

Related U.S. Application Data

(63) Continuation of application No. 16/848,274, filed on Apr. 14, 2020, now Pat. No. 11,165,477, which is a (Continued)

(51) Int. Cl.
*H04B 7/06* (2006.01)
*H04B 7/0426* (2017.01)

(52) U.S. Cl.
CPC .......... *H04B 7/0617* (2013.01); *H04B 7/043* (2013.01); *H04B 7/0608* (2013.01); *H04B 7/063* (2013.01); *H04B 7/0656* (2013.01)

(58) Field of Classification Search
CPC .... H04B 7/0617; H04B 7/042; H04B 7/0608; H04B 7/063; H04B 7/0656
(Continued)

(56) References Cited

U.S. PATENT DOCUMENTS 5,874,860 A    2/1999    Brunel et al.
6,703,901 B2   3/2004    Jovenin et al.
(Continued)

FOREIGN PATENT DOCUMENTS

WO    WO 2010/078193    7/2010
WO    WO 2013/015766    1/2013
(Continued)

OTHER PUBLICATIONS

FCC ID: IHDT56XL1, Motorola Model: MD1005G, "39 GHz Power Density Simulation and Measurement Report" dated Feb. 2019, in 16 pages.
(Continued)

*Primary Examiner* — Kevin M Burd
(74) *Attorney, Agent, or Firm* — Knobbe, Martens, Olson & Bear, LLP

(57) ABSTRACT

Apparatus and methods for beamforming communication systems with sensor aided beam management are provided. In certain embodiments, a beamforming communication system includes an antenna array including a plurality of antenna elements. The beamforming communication system further includes a plurality of signal conditioning circuits operatively associated with the antenna elements, one or more sensors that generate sensor data, and a beam management circuit that controls the signal conditioning circuits to manage beamforming. The beam management circuit provides beam management based on the sensor data.

16 Claims, 16 Drawing Sheets

Related U.S. Application Data continuation of application No. 16/549,785, filed on Aug. 23, 2019, now abandoned.

(60) Provisional application No. 62/724,757, filed on Aug. 30, 2018.

(58) Field of Classification Search
USPC .......................................................... 375/267
See application file for complete search history.

(56) References Cited

U.S. PATENT DOCUMENTS

| | | | |
|---|---|---|---|
| 7,245,889 B2 | 7/2007 | Brunel et al. | |
| 7,333,554 B2 | 2/2008 | Brunel | |
| 7,684,461 B2 | 3/2010 | Brunel | |
| 8,396,096 B2 | 3/2013 | Noel et al. | |
| 8,437,725 B2 | 5/2013 | Brunel et al. | |
| 8,755,751 B2 | 6/2014 | Brunel et al. | |
| 8,938,203 B2 | 1/2015 | Ancora et al. | |
| 9,059,795 B2 | 6/2015 | Sittler et al. | |
| 10,145,878 B2 | 12/2018 | Brunel et al. | |
| 10,236,966 B2 | 3/2019 | Brunel et al. | |
| 10,439,789 B2 | 10/2019 | Brunel et al. | |
| 11,165,477 B2* | 11/2021 | Brunel | H04B 7/0656 |
| 2004/0085203 A1* | 5/2004 | Junqua | G07B 15/00 |
| | | | 340/539.11 |
| 2006/0232468 A1* | 10/2006 | Parker | H01Q 1/241 |
| | | | 342/359 |
| 2009/0021424 A1* | 1/2009 | Wahlberg | H04B 7/18513 |
| | | | 342/352 |
| 2010/0008268 A1* | 1/2010 | Whinnett | H04B 7/086 |
| | | | 455/562.1 |
| 2014/0301339 A1 | 10/2014 | Sesia et al. | |
| 2017/0310805 A1* | 10/2017 | Dai | H04M 1/725 |
| 2018/0198212 A1 | 7/2018 | Rodriguez | |
| 2019/0158137 A1 | 5/2019 | Brunel et al. | |
| 2019/0178927 A1 | 6/2019 | Brunel et al. | |
| 2019/0372630 A1 | 12/2019 | Brunel et al. | |
| 2019/0377075 A1* | 12/2019 | Tsfati | H04B 17/27 |
| 2020/0029320 A1* | 1/2020 | Ryu | H04B 7/088 |
| 2020/0076488 A1 | 3/2020 | Brunel | |
| 2020/0382187 A1 | 12/2020 | Brunel | |

FOREIGN PATENT DOCUMENTS

| | | |
|---|---|---|
| WO | WO 2014/163854 | 10/2014 |
| WO | WO 2015/183472 | 12/2015 |
| WO | WO 2018/125139 | 7/2018 |
| WO | WO 2018/129355 | 7/2018 |

OTHER PUBLICATIONS

FCC ID: IHDT56XL1, Motorola Model: MD1005G, Appendix for 39 GHz Power Density Simulation and Measurement Report dated Feb. 2019, in 22 pages.

Qualcomm Technologies, Inc., "First 5G mmWave Antenna Module for Smartphones" Microwave Journal dated Dec. 12, 2018, in 4 pages.

* cited by examiner

BEAMFORMING COMMUNICATION SYSTEMS WITH SENSOR AIDED BEAM MANAGEMENT

CROSS-REFERENCE TO RELATED APPLICATIONS

This application is a continuation of U.S. application Ser. No. 16/848,274, filed Apr. 14, 2020, and titled "BEAMFORMING COMMUNICATION SYSTEMS WITH SENSOR AIDED BEAM MANAGEMENT," which is a continuation of U.S. application Ser. No. 16/549,785, filed Aug. 23, 2019, and titled "BEAMFORMING COMMUNICATION SYSTEMS WITH SENSOR AIDED BEAM MANAGEMENT," which claims the benefit of priority under 35 U.S.C. § 119 of U.S. Provisional Patent Application No. 62/724,757, filed Aug. 30, 2018, and titled "BEAMFORMING COMMUNICATION SYSTEMS WITH SENSOR AIDED BEAM MANAGEMENT," which is herein incorporated by reference in its entirety.

BACKGROUND

Field

Embodiments of the invention relate to electronic systems, and in particular, to radio frequency electronics.

Description of Related Technology

Radio frequency (RF) communication systems can be used for transmitting and/or receiving signals of a wide range of frequencies. For example, an RF communication system can be used to wirelessly communicate RF signals in a frequency range of about 30 kHz to 300 GHz, such as in the range of about 410 MHz to about 7.125 GHz for fifth generation (5G) frequency range 1 (FR1) communications and in the range of about 24.25 GHz to about 52.6 GHz for 5G frequency range 2 (FR2) communications.

Examples of RF communication systems include, but are not limited to, mobile phones, tablets, base stations, network access points, customer-premises equipment (CPE), laptops, and wearable electronics.

SUMMARY

In certain embodiments, the present disclosure relates to a beamforming communication system. The beamforming communication system includes a first antenna array including a plurality of antenna elements, a plurality of signal conditioning circuits each operatively associated with a corresponding one of the plurality of antenna elements, one or more sensors configured to generate sensor data, and a beam management circuit configured to control the plurality of signal conditioning circuits. The beam management circuit is operable to provide beam management based on the sensor data.

In some embodiments, the beam management circuit is configured to steer a transmit beam radiated by the first antenna array based on the sensor data. According to a number of embodiments, the beam management circuit is configured to process the sensor data to maintain the transmit beam pointed at a base station. According to various embodiments, the beam management circuit is configured to process the sensor data to move the transmit beam away from environmental blockage.

In several embodiments, the beamforming communication system further includes a second antenna array, and the beam management circuit is configured to transmit using the second antenna array in response to determining that the sensor data indicates environmental blockage of the first antenna array.

In various embodiments, the beam management circuit is configured to steer a receive beam received via the first antenna array based on the sensor data.

In some embodiments, the beamforming communication system further includes a second antenna array, and the beam management circuit is configured to receive using the second antenna array in response to determining that the sensor data indicates environmental blockage of the first antenna array.

In several embodiments, the beam management circuit is configured to control transmission of at least a portion of the sensor data to a base station.

In various embodiments, the beam management circuit is configured to receive local map data from a base station, and to further control beam management based on the local map data.

In a number of embodiments, the one or more sensors include a Global Positioning System sensor.

In several embodiments, the one or more sensors include an accelerometer.

In various embodiments, the one or more sensors include a gyroscope.

In some embodiments, the one or more sensors include a barometer.

In a number of embodiments, the one or more sensors include a magnetometer.

In several embodiments, the one or more sensors include a plug detection sensor.

In some embodiments, the one or more sensors include a time of flight sensor.

In various embodiments, the one or more sensors include an infrared sensor.

In several embodiments, the one or more sensors include a camera.

In some embodiments, the one or more sensors include an antenna reflection measurement detector.

In various embodiments, the beamforming communication system further includes a baseband modem including the beam management circuit. According to a number of embodiments, the beamforming communication system further includes an application processor, and the beam management circuit is configured to receive the sensor data via the application processor.

In several embodiments, the beamforming communication system further includes a transceiver including the plurality of signal conditioning circuits.

In a number of embodiments, the plurality of signal conditioning circuits are configured to condition fifth generation signals.

In some embodiments, the plurality of signal conditioning circuits are configured to condition millimeter wave signals.

In various embodiments, the beam management circuit is configured to control an amount of phase shift provided by each of the plurality of signal conditions circuits.

In certain embodiments, the present disclosure relates to user equipment for a cellular network. The user equipment includes a first antenna array, a front end system electrically coupled to the first antenna array and including a plurality of signal conditioning circuits, one or more sensors configured to generate sensor data, and a beam management circuit configured to control the plurality of signal conditioning circuits. The beam management circuit is operable to provide beam management based on the sensor data.

In some embodiments, the beam management circuit is configured to steer a transmit beam radiated by the first antenna array based on the sensor data. According to several embodiments, the beam management circuit is configured to process the sensor data to maintain the transmit beam pointed at a base station. In accordance with a number of embodiments, the beam management circuit is configured to process the sensor data to move the transmit beam away from environmental blockage.

In several embodiments, the user equipment further includes a second antenna array, and the beam management circuit is configured to transmit using the second antenna array in response to determining that the sensor data indicates environmental blockage of the first antenna array.

In some embodiments, the beam management circuit is configured to steer a receive beam received via the first antenna array based on the sensor data.

In various embodiments, the user equipment further includes a second antenna array, and the beam management circuit is configured to receive using the second antenna array in response to determining that the sensor data indicates environmental blockage of the first antenna array.

In several embodiments, the beam management circuit is configured to control transmission of at least a portion of the sensor data to a base station.

In a number of embodiments, the beam management circuit is configured to receive local map data from a base station, and to further control beam management based on the local map data.

In some embodiments, the one or more sensors include a Global Positioning System sensor.

In various embodiments, the one or more sensors include an accelerometer.

In several embodiments, the one or more sensors include a gyroscope.

In a number of embodiments, the one or more sensors include a barometer.

In some embodiments, the one or more sensors include a magnetometer.

In various embodiments, the one or more sensors include a plug detection sensor.

In several embodiments, the one or more sensors include a time of flight sensor.

In a number of embodiments, the one or more sensors include an infrared sensor.

In some embodiments, the one or more sensors include a camera.

In various embodiments, the one or more sensors include an antenna reflection measurement detector.

In a number of embodiments, the user equipment further includes a baseband modem including the beam management circuit. According to several embodiments, the user equipment further includes an application processor, and the beam management circuit is configured to receive the sensor data via the application processor.

In various embodiments, the user equipment further includes a transceiver including the plurality of signal conditioning circuits.

In several embodiments, the plurality of signal conditioning circuits are configured to condition fifth generation signals.

In some embodiments, the plurality of signal conditioning circuits are configured to condition millimeter wave signals.

In various embodiments, the beam management circuit is configured to control a plurality of phase shifts provided by the plurality of signal conditions circuits.

In certain embodiments, the present disclosure relates to a method of beam management in user equipment. The method includes generating sensor data using one or more sensors, conditioning a plurality of radio frequency signals communicated using a first antenna array using a front end system, controlling the front end system using a beam management circuit, and processing the sensor data to provide beam management using the beam management circuit.

In several embodiments, the method further includes steering a transmit beam radiated by the first antenna array based on the sensor data. According to a number of embodiments, the method further includes processing the sensor data to maintain the transmit beam pointed at a base station. In accordance with various embodiments, the method further includes processing the sensor data to move the transmit beam away from environmental blockage.

In a number of embodiments, the method further includes transmitting using a second antenna array in response to determining that the sensor data indicates environmental blockage of the first antenna array.

In various embodiments, the method further includes steering a receive beam received via the first antenna array based on the sensor data.

In several embodiments, the method further includes receiving using a second antenna array in response to determining that the sensor data indicates environmental blockage of the first antenna array.

In some embodiments, the method further includes transmitting at least a portion of the sensor data to a base station.

In a number of embodiments, the method further includes receiving local map data from a base station, and providing further beam management based on the local map data.

In various embodiments, the one or more sensors include a Global Positioning System sensor.

In a number of embodiments, the one or more sensors include an accelerometer.

In several embodiments, the one or more sensors include a gyroscope.

In some embodiments, the one or more sensors include a barometer.

In various embodiments, the one or more sensors include a magnetometer.

In a number of embodiments, the one or more sensors include a plug detection sensor.

In several embodiments, the one or more sensors include a time of flight sensor.

In some embodiments, the one or more sensors include an infrared sensor.

In various embodiments, the one or more sensors include a camera.

In a number of embodiments, the one or more sensors include an antenna reflection measurement detector.

In certain embodiments, the present disclosure relates to a mobile device. The mobile device includes a first antenna array including a plurality of antenna elements, a front end system electrically connected to the first antenna array and operable to condition a plurality of radio frequency signals each transmitted by a corresponding one of the plurality of antenna elements to thereby form a transmit beam, a first sensor configured to generate sensor data, and a beam management circuit configured to control the front end system to manage the transmit beam based on the sensor data.

In some embodiments, beam management circuit is configured to steer the transmit beam based on the sensor data. According to various embodiments, the beam management circuit is configured to process the sensor data to maintain the transmit beam pointed at a base station. In accordance with several embodiments, the beam management circuit is configured to process the sensor data to move the transmit beam away from environmental blockage.

In a number of embodiments, the mobile device further includes a second antenna array, and the beam management circuit is configured to disable the first antenna array and to transmit using the second antenna array in response to determining that the sensor data indicates environmental blockage of the first antenna array. According to several embodiments, the mobile device further includes a second sensor configured to detect environmental blockage of the second antenna array.

In various embodiments, the beam management circuit is configured to control transmission of at least a portion of the sensor data to a base station.

In some embodiments, the first sensor is an accelerometer.

In several embodiments, the first sensor is a plug detection sensor.

In a number of embodiments, the first sensor is a time of flight sensor, an infrared sensor, or a camera.

In various embodiments, the first sensor is an antenna reflection measurement detector.

In several embodiments, the mobile device further includes a baseband modem including the beam management circuit. According to several embodiments, the mobile device further includes an application processor, and the beam management circuit is configured to receive the sensor data via the application processor.

In certain embodiments, the present disclosure relates to a method of beam management in a mobile device. The method includes conditioning a plurality of radio frequency signals using a front end system, transmitting each of the plurality of radio frequency signals on a corresponding one of a plurality of antenna elements of a first antenna array to form a transmit beam, generating sensor data using a sensor, and controlling the front end system to manage the transmit beam based on the sensor data.

In various embodiments, the method further includes steering the transmit beam based on the sensor data. According to several embodiments, the method further includes processing the sensor data to maintain the transmit beam pointed at a base station. In accordance with a number of embodiments, the method further includes processing the sensor data to move the transmit beam away from environmental blockage.

In some embodiments, the method further includes transmitting using a second antenna array in response to determining that the sensor data indicates environmental blockage of the first antenna array.

In certain embodiments, the present disclosure relates to a radio frequency module for a mobile device. The radio frequency module includes an antenna array configured to radiate a transmit beam in response to receiving a plurality of radio frequency signals, a sensor configured to generate sensor data, and a semiconductor die including signal conditioning circuitry operable to condition the plurality of radio frequency signals, and a beam management circuit configured to control the signal conditioning circuitry to manage the transmit beam based on the sensor data.

In several embodiments, the sensor is configured to detect environmental blockage of the antenna array.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1:
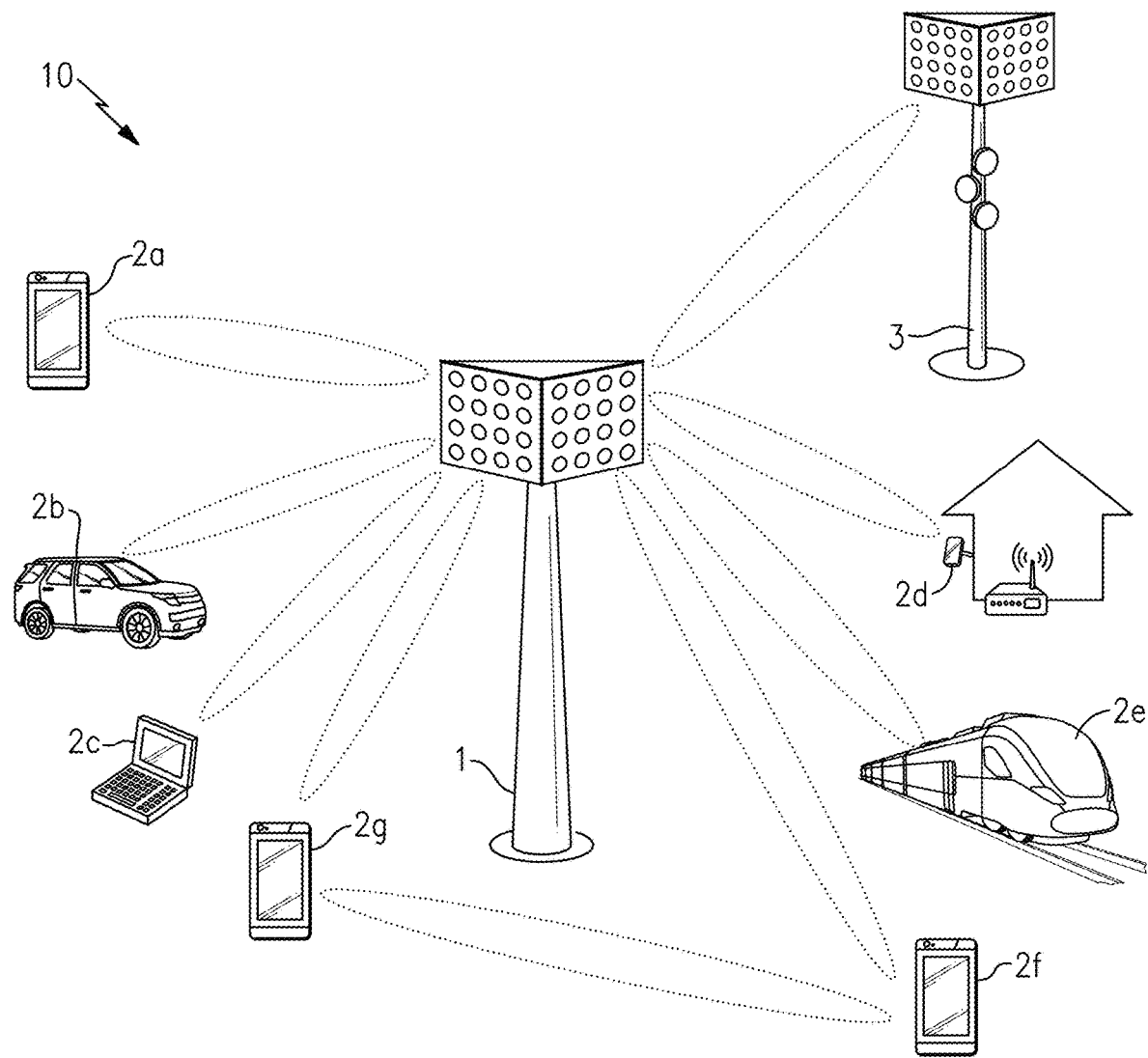
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings in which like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and plans to introduce Phase 2 of 5G technology in Release 16 (targeted for 2019). Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul (for instance, as between mobile device 2g and mobile device 2f).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
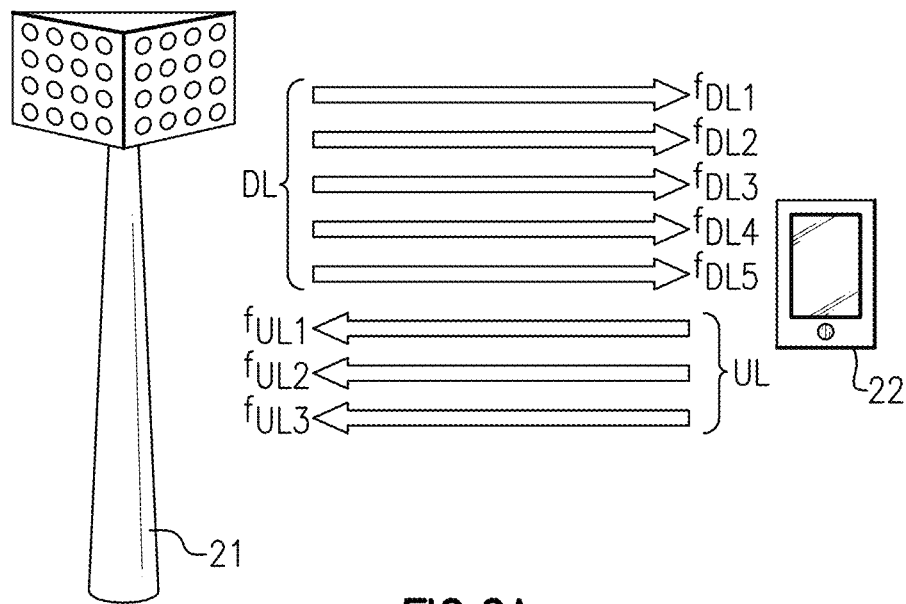
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
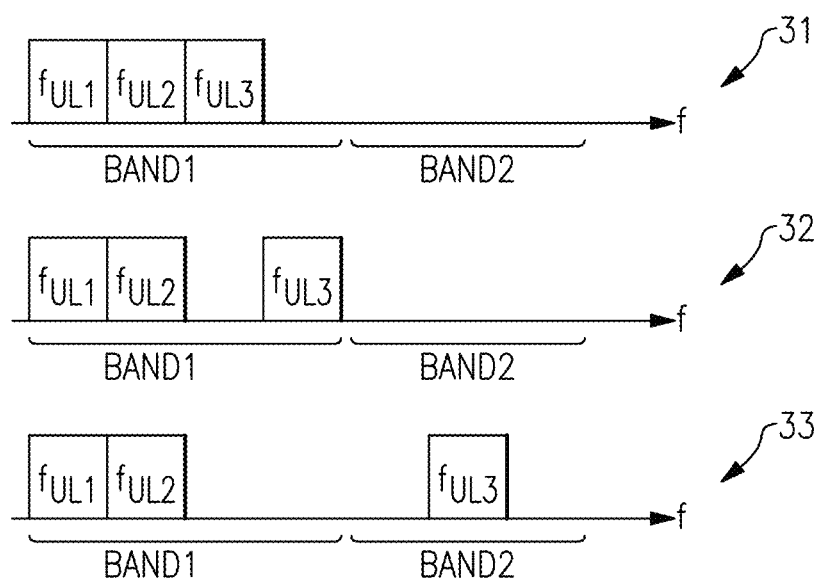
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier $f_{UL1}$, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL2}$ of a first frequency band BAND1 with component carrier $f_{UL3}$ of a second frequency band BAND2.

Figure 2C:
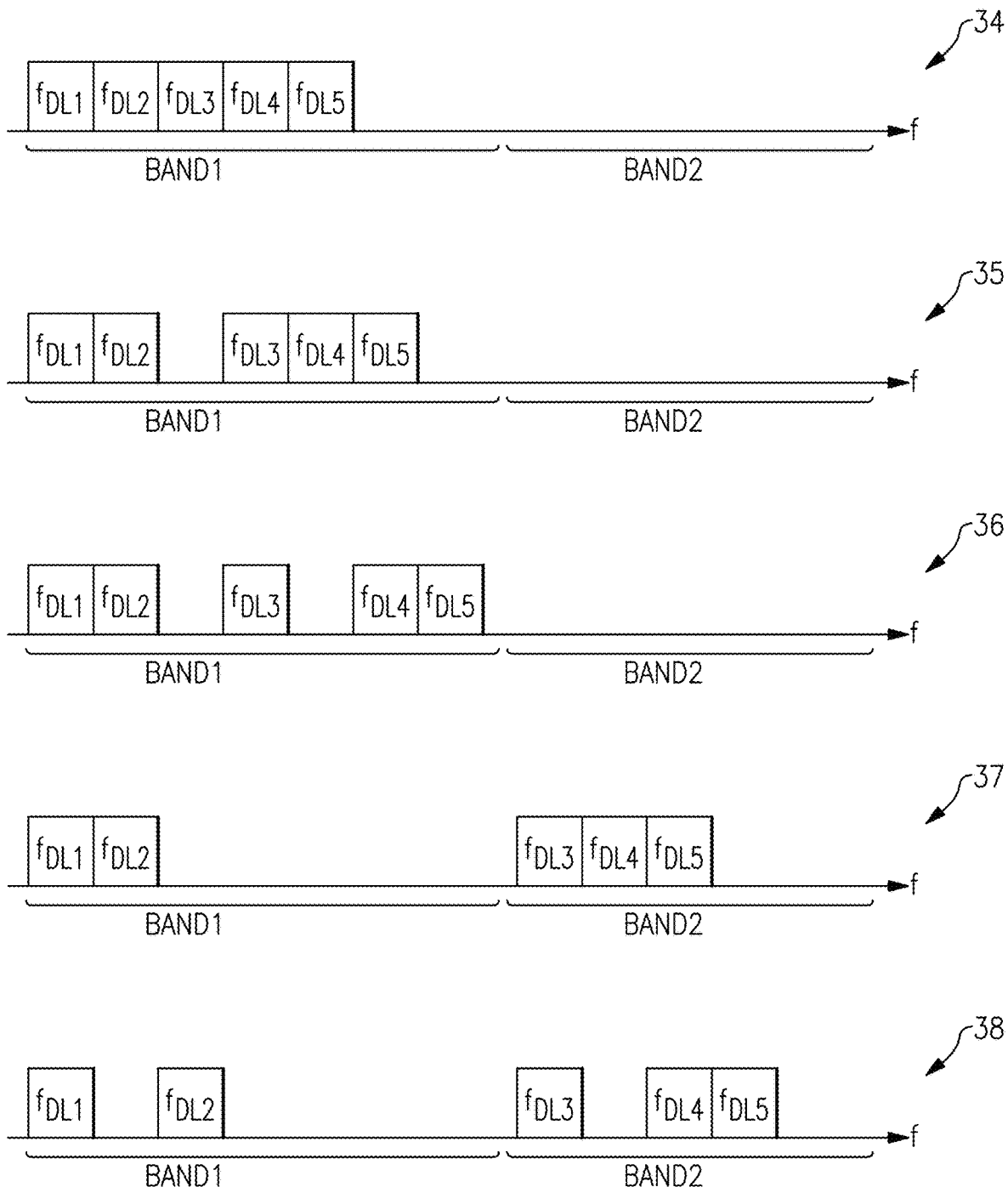
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and secondary cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink.

Figure 3A:
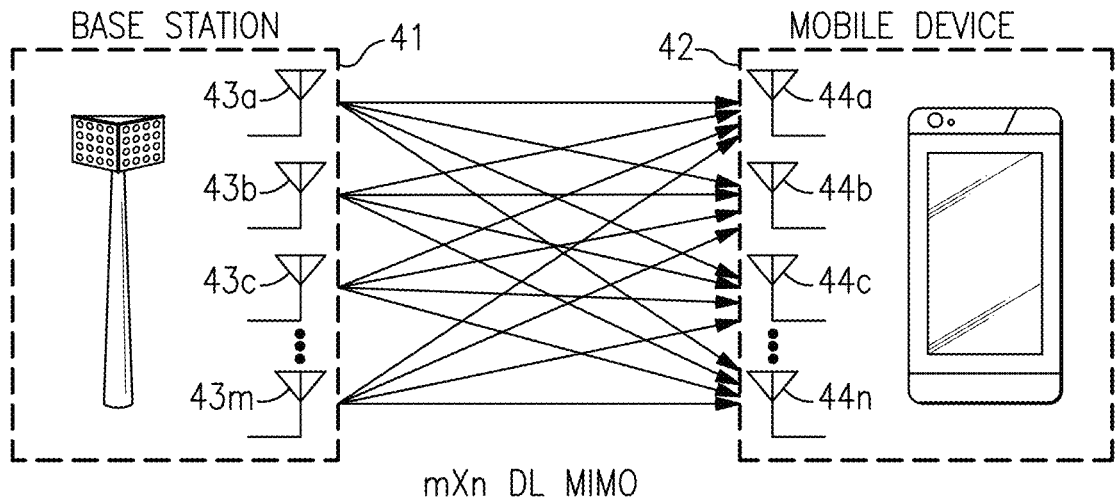
FIG. 3A is a schematic diagram of one example of a downlink channel using multi-input and multi-output (MIMO) communications.
Figure 3B:
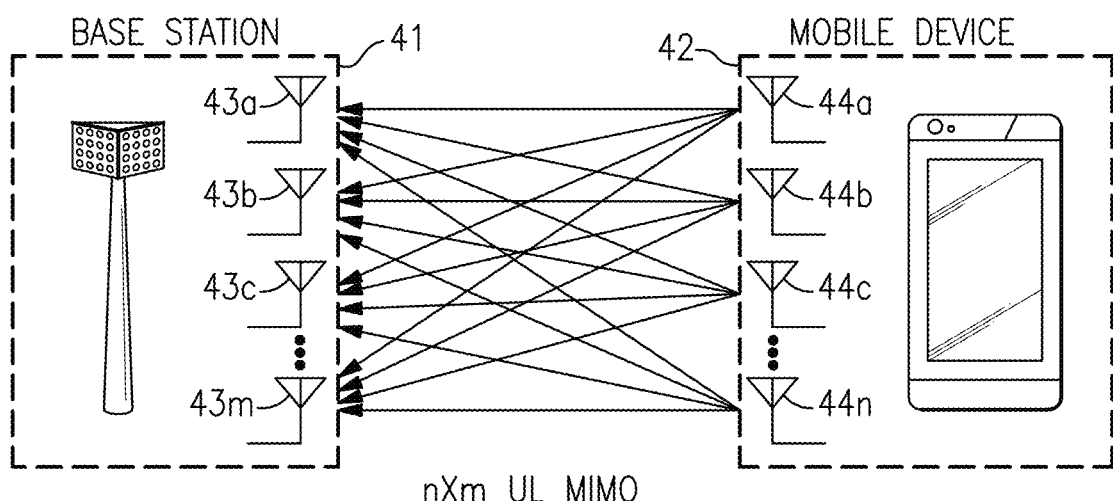
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas 43a, 43b, 43c, . . . 43m of the base station 41 and receiving using N antennas 44a, 44b, 44c, . . . 44n of the mobile device 42. Accordingly, FIG. 3A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas 44a, 44b, 44c, . . . 44n of the mobile device 42 and receiving using M antennas 43a, 43b, 43c, . . . 43m of the base station 41. Accordingly, FIG. 3B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3C:
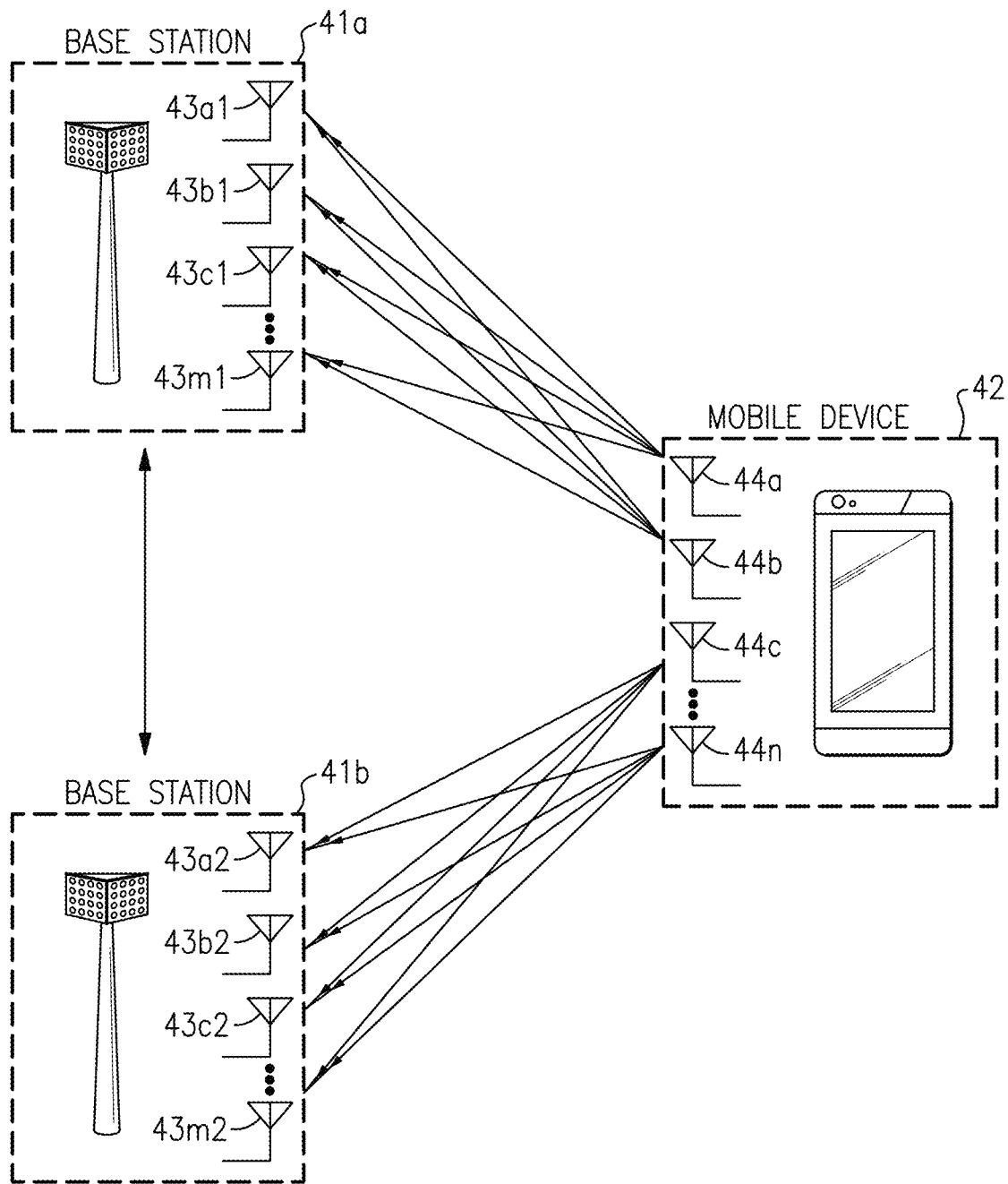
FIG. 3C is schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas 44a, 44b, 44c, . . . 44n of the mobile device 42. Additional a first portion of the uplink transmissions are received using M antennas 43a1, 43b1, 43c1, . . . 43m1 of a first base station 41a, while a second portion of the uplink transmissions are received using M antennas 43a2, 43b2, 43c2, . . . 43m2 of a second base station 41b. Additionally, the first base station 41a and the second base station 41b communication with one another over wired, optical, and/or wireless links.

The MIMO scenario of FIG. 3C illustrates an example in which multiple base stations cooperate to facilitate MIMO communications.

Beamforming Communication Systems with Sensor Aided Beam Management

Antenna arrays can be used in a wide variety of applications. For instance, antenna arrays can be used to transmit and/or receive radio frequency (RF) signals in base stations, network access points, mobile phones, tablets, customer-premises equipment (CPE), laptops, computers, wearable electronics, and/or other communication devices.

Communication devices that utilize millimeter wave carriers (for instance, 30 GHz to 300 GHz), centimeter wave carriers (for instance, 3 GHz to 30 GHz), and/or other carrier frequencies can employ an antenna array to provide beam formation and directivity for transmission and/or reception of signals.

For example, in the context of signal transmission, the signals from the antenna elements of the antenna array combine using constructive and destructive interference to generate an aggregate transmit signal exhibiting beam-like qualities with more signal strength propagating in a given direction away from the antenna array. In the context of signal reception, more signal energy is received by the antenna array when the signal is arriving from a particular direction. Accordingly, an antenna array can also provide directivity for reception of signals.

A signal conditioning circuit can be used to condition a transmit signal for transmission via an antenna element and/or to condition a received signal from the antenna element. In one example, a signal conditioning circuit includes a variable gain amplifier for providing gain control and a variable phase shifter for providing phase control.

5G NR specifies beamforming not only in base stations, but also in UE. For example, phased array antennas can have relatively compact dimensions suitable for incorporation in UE for certain beamforming applications, for instance, at frequencies above about 10 GHz, or more particularly, for FR2 and/or at millimeter wave frequencies.

To provide an ability to communicate beams in multiple directions, UE can include multiple antenna arrays to cover beamforming capability over a range of directions, for instance, across an angular range covering a full sphere encompassing the UE. When multiple antenna arrays are included, each antenna array can have different and/or separately controllable polarization, antenna gain, beam steering, and/or other parameters to facilitate communicating in a particular direction.

The beam angle of a beamforming communication system can be changed over time to maintain a communication link. For example, beam angle can be changed as a relative position between UE and a base station changes. To maintain performance (for instance, link connectivity and/or bandwidth), it is desirable to locate and/or track corresponding base station and UE beams to thereby maintain the communication link in the presence of environmental blockage and/or UE mobility.

Apparatus and methods for beamforming communication systems with sensor aided beam management are provided. In certain embodiments, a beamforming communication system includes an antenna array including a plurality of antenna elements. The beamforming communication system further includes a plurality of signal conditioning circuits operatively associated with the antenna elements, one or more sensors that generate sensor data, and a beam management circuit that controls the signal conditioning circuits to manage beamforming. The beam management circuit provides beam management based on the sensor data.

In certain implementations, the beam management circuit controls beam steering based on the sensor data from the sensors. For example, with respect to beam transmission, the sensor data can be used to steer a transmit beam away from detected objects that would otherwise block and/or attenuate the transmit beam. The sensor data can also be used to steer the transmit beam to maintain the transmit beam pointed at a base station as UE position changes and/or to select a particular antenna array for generating a transmit beam sent to a base station.

Additionally or alternatively, the sensor data can be used by the beam management circuit for steering a receive beam and/or for selecting a particular antenna array for receiving a beam. For example, in the context of beam reception, the sensor data can be processed by the beam management circuit to maintain a direction of the receive beam aimed toward the base station and/or to select an antenna array suited for communicating with a particular base station.

In certain implementations, the sensor data is used to facilitate beam searching and/or scanning, for instance, to avoid beam angles associated with environmental blockage. Likewise, the sensor data can aid in beam recovery, such as when a transmit beam and/or a receive beam is lost due to environment blockage.

For purposes of beam discovery, a UE can scan various geometric locations to locate a pilot beam or other beam transmitted by a base station. In certain implementations, the sensor data can be processed by the UE to aid identifying probable locations for discovering the beam, thereby reducing a latency in beam discovery and/or increasing an efficiency in scanning.

The sensor data can also aid a base station in beam tracking as UE moves within a cellular network. For example, in certain implementations, at least a portion of the sensor data is sent from the UE to the base station over another communication link (for instance, an LTE link) and used to steer a transmit beam from a base station toward UE and/or to maintain connectivity of a receive beam from the UE. Furthermore, the base station can provide local three-dimensional map data to the UE such that obstacles can be anticipated and/or ray traces (for instance, line-of-sight opportunities) are identified and/or calculated based on the UE processing sensor data to determine position and orientation.

According, in certain implementations sensor data is employed at multiple levels of utilization, including: (i) a first level of utilization in which UE uses the sensor data autonomously to control beam management based on sensor data indicating position, rotation, and/or detection of obstacles; (ii) a second level of utilization in which UE communicates the sensor data or a reduced set of the sensor data to the base station to aid the base station in beamforming; and (iii) a third level of utilization in which the base station provides local map data to the UE.

In certain implementations, the sensor data is processed to control beamforming to limit Maximum Permissible Exposure (MPE). For instance, MPE is specification relating to controlling exposure of closely located tissues to RF signal transmissions of 6 GHz or more, for instance, FR2 and/or millimeter waves. In one example, MPE can be used to limit a user's exposure to radiation when the user is holding a tablet on their knees. MPE is yet another example of a parameter that can be managed based on sensor data in accordance with the teachings herein.

In certain implementations, a first sensor is associated with a first antenna array and a second sensor is associated with a second antenna array. Additionally, the UE selectively communicates using the first antenna array and/or the second antenna array based on sensor data from the first sensor and the second sensor. Associating sensors with corresponding antenna arrays can be expanded to implementations with more than two antenna arrays. For instance, in one example, four or more antenna arrays are distributed around the UE, with each antenna array having at least one associated sensor.

In certain implementations, the UE communicates using the first antenna array when the first sensor indicates that the first antenna array is not blocked by environmental blockage, and using the second antenna array when the first sensor indicates that the first antenna array is blocked and the second sensor indicates that the second antenna array is not blocked. In certain implementations, the first sensor is a dedicated sensor for detecting the blockage of the first antenna array, and the second sensor is a dedicated sensor for detecting the blockage of the second antenna array. For instance, the first sensor and the second sensor can correspond to dedicated proximity sensors rather than existing sensors used in the UE for other functions or purposes.

In certain implementations, the UE corresponds to a mobile phone, tablet, or other handheld device moved about in the cellular network by a user. However, cellular-enabled vehicles (for instance, cars), drones, and other types of motorized UE can also benefit from transmitting sensor data to the base station in this manner. Furthermore, certain motorized UE, such as drones, can further send planned route data to facilitate in maintaining the beamforming communication link with the base station.

Figure 4A:
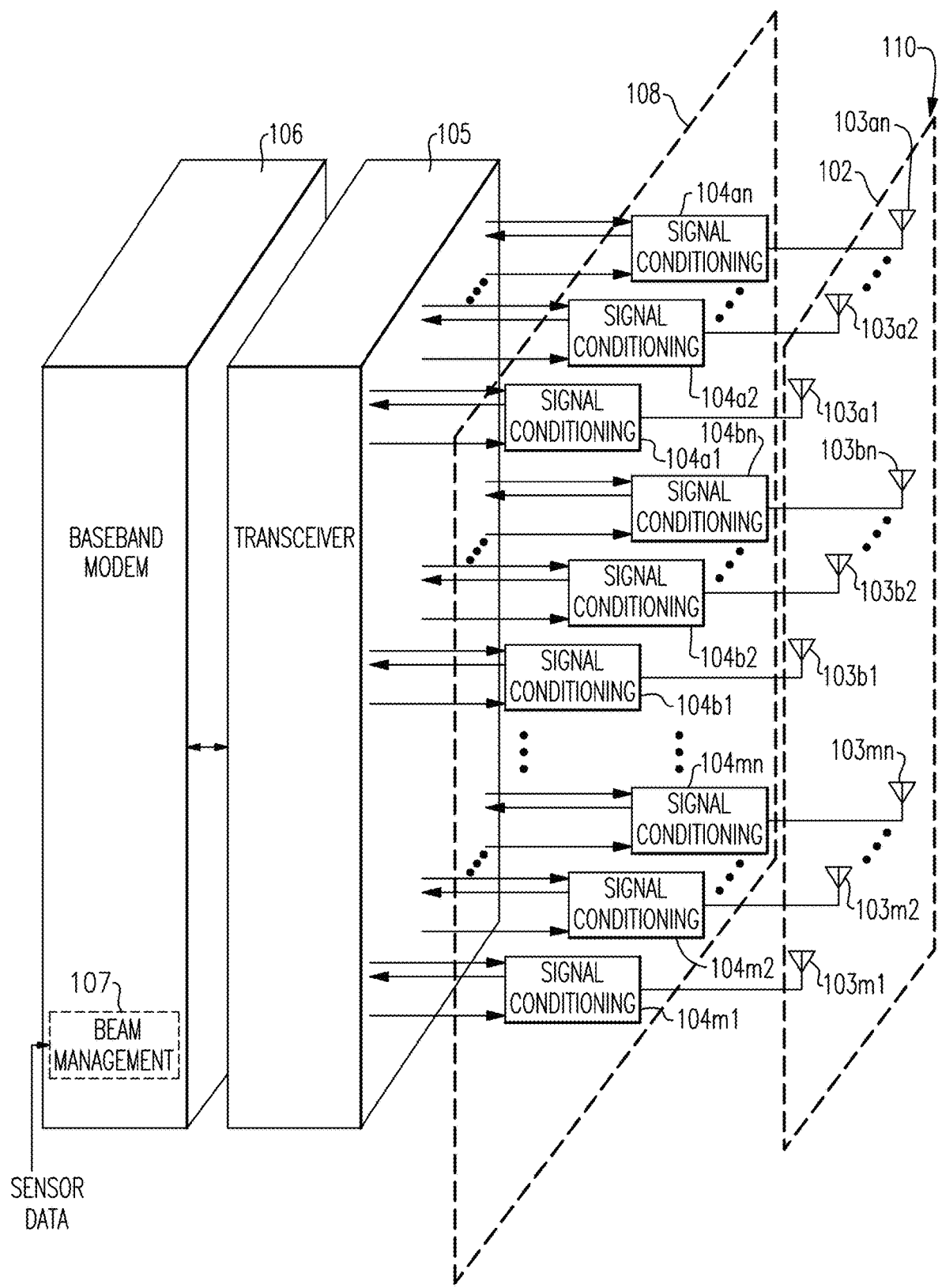
FIG. 4A is a schematic diagram of one embodiment of a beamforming communication system.

FIG. 4A is a schematic diagram of one example of a communication system 110 that operates with beamforming. The communication system 110 includes an antenna array 102, a transceiver 105, a baseband modem 106, and a front end system 108. The antenna array 102 includes antenna elements 103a1, 103a2 . . . 103an, 103b1, 103b2 . . . 103bn, 103m1, 103m2 . . . 103mn. Additionally, the front end system 108 includes signal conditioning circuits 104a1, 104a2 . . . 104an, 104b1, 104b2 . . . 104bn, 104m1, 104m2 . . . 104mn.

In the illustrated embodiment, the baseband modem 106 includes a beam management circuit 107. Thus, the beam management circuit 107 is included in the baseband modem 106, in this embodiment. However, the beam management circuit 107 can be in any suitable location including, but not limited to, the transceiver 105 and/or the front end system 108.

Communications systems that communicate using millimeter wave carriers (for instance, 30 GHz to 300 GHz), centimeter wave carriers (for instance, 3 GHz to 30 GHz), and/or other frequency carriers can employ an antenna array to provide beam formation and directivity for transmission and/or reception of signals.

For example, in the illustrated embodiment, the communication system 110 includes an array 102 of m×n antenna elements, which are each controlled by a separate signal conditioning circuit, in this embodiment. As indicated by the ellipses, the communication system 110 can be implemented with any suitable number of antenna elements and signal conditioning circuits.

The signal conditioning circuits 104a1, 104a2 . . . 104an, 104b1, 104b2 . . . 104bn, 104m1, 104m2 . . . 104mn can be used to condition signals for transmission and/or reception via the antenna array 102. Although an embodiment in which the signal conditioning circuits 4a, 4b . . . 4m provide signal conditioning for both transmission and reception, other implementations are possible. For example, in certain implementations, a communication device includes separate antenna arrays for receiving signals and for transmitting signals. Thus, in certain implementations, a signal conditioning circuit is used for transmit conditioning but not receive conditioning, or for receive conditioning but not transmit conditioning.

With respect to signal transmission, the signal conditioning circuits 104a1, 104a2 . . . 104an, 104b1, 104b2 . . . 104bn, 104m1, 104m2 . . . 104mn can provide transmit signals to the antenna array 102 such that signals radiated from the antenna elements combine using constructive and destructive interference to generate an aggregate transmit signal exhibiting beam-like qualities with more signal strength propagating in a given direction away from the antenna array 102.

In the context of signal reception, the signal conditioning circuits 104a1, 104a2 . . . 104an, 104b1, 104b2 . . . 104bn, 104m1, 104m2 . . . 104mn process the received signals (for instance, by separately controlling received signal phases and amplitudes) such that more signal energy is received when the signal is arriving at the antenna array 102 from a particular direction. Accordingly, the communication system 110 also provides directivity for reception of signals.

The relative concentration of signal energy into a transmit beam or a receive beam can be enhanced by increasing the size of the array. For example, with more signal energy focused into a transmit beam, the signal is able to propagate for a longer range while providing sufficient signal level for RF communications. For instance, a signal with a large proportion of signal energy focused into the transmit beam can exhibit high effective isotropic radiated power (EIRP).

In the illustrated embodiment, the transceiver 105 provides transmit signals to the signal conditioning circuits and processes signals received from the signal conditioning circuits. As shown in FIG. 4A, the transceiver 105 generates control signals for the signal conditioning circuits. The control signals can be used for a variety of functions, such as setting phase and/or amplitude of transmitted or received signals for beamforming and selectively enabling/disabling communications on the antenna array 102.

With continuing reference to FIG. 4A, the beam management circuit 107 provides one or more control signals to the transceiver 105 for controlling phase and/or amplitude values of the signal conditioning circuits 104a1, 104a2 . . . 104an, 104b1, 104b2 . . . 104bn, 104m1, 104m2 . . . 104mn. Thus, the beam management circuit 107 can steer transmit and/or receive beams. Furthermore, the beam management circuit 107 can selectively enable or disable communications on the antenna array 102 (for instance, disable transmissions on the antenna array 102 in favor of transmitting using a different antenna array). In certain implementations, data is communicated between the baseband modem 106 and transceiver 105 at least in part using a serial interface or bus.

As shown in FIG. 4A, the beam management circuit 107 receives sensor data for controlling beam steering. The beam management circuit 107 uses the sensor data for beam management in accordance with the teachings herein.

Figure 4B:
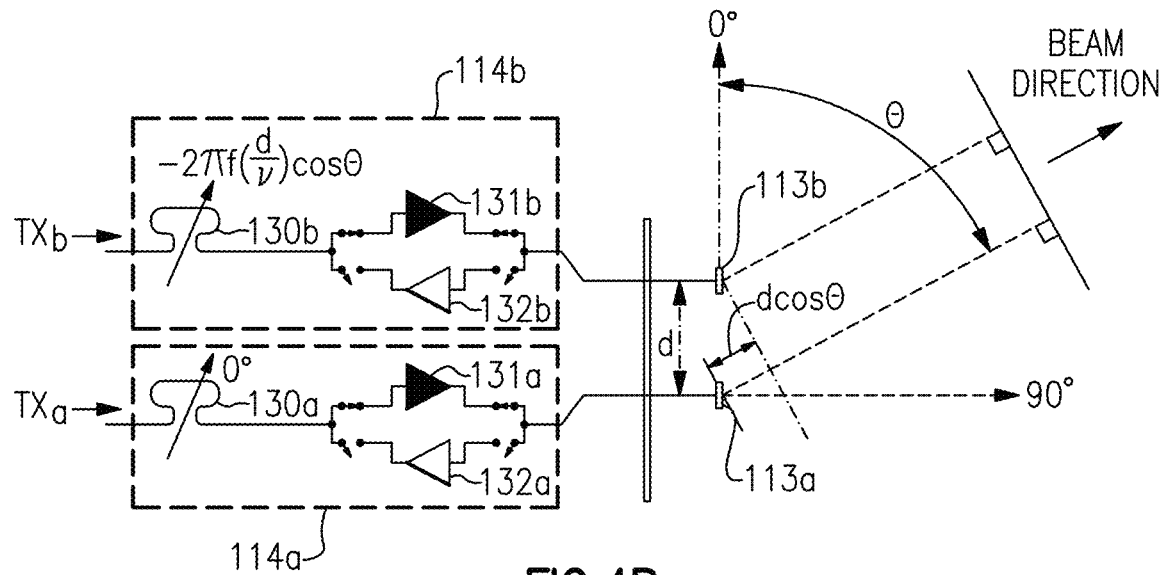
FIG. 4B is a schematic diagram of one example of beamforming to provide a transmit beam.

FIG. 4B is a schematic diagram of one example of beamforming to provide a transmit beam. FIG. 4B illustrates a portion of a communication system including a first signal conditioning circuit 114a, a second signal conditioning circuit 114b, a first antenna element 113a, and a second antenna element 113b.

Although illustrated as included two antenna elements and two signal conditioning circuits, a communication system can include additional antenna elements and/or signal conditioning circuits. For example, FIG. 4B illustrates one embodiment of a portion of the communication system 110 of FIG. 4A.

In the illustrated embodiment, the first signal conditioning circuit 114a includes a first phase shifter 130a, a first power amplifier 131a, a first low noise amplifier (LNA) 132a, and switches for controlling selection of the power amplifier 131a or LNA 132a. Additionally, the second signal conditioning circuit 114b includes a second phase shifter 130b, a second power amplifier 131b, a second LNA 132b, and switches for controlling selection of the power amplifier 131b or LNA 132b.

Although one embodiment of signal conditioning circuits is shown, other implementations of signal conditioning circuits are possible. For instance, in one example, a signal conditioning circuit includes one or more band filters, switches, attenuators, amplifiers, phase shifters, duplexers, diplexers, triplexers, circulators, and/or other components. Furthermore, although an implementation with an analog phase shifter is shown, the teachings herein are also applicable to implementations using digital phase shifting (for instance, phase shifting using digital baseband processing in a baseband modem) as well as to implementations using a combination of analog phase shifting and digital phase shifting.

In the illustrated embodiment, the first antenna element 113a and the second antenna element 113b are separated by a distance d. Additionally, FIG. 4B has been annotated with an angle θ, which in this example has a value of about 90° when the transmit beam direction is substantially perpendicular to a plane of the antenna array and a value of about 0° when the transmit beam direction is substantially parallel to the plane of the antenna array.

By controlling the relative phase of the transmit signals provided to the antenna elements 113a, 113b, a desired transmit beam angle θ can be achieved. For example, when the first phase shifter 130a has a reference value of 0°, the second phase shifter 130b can be controlled to provide a phase shift of about $-2\pi f(d/v)\cos\theta$ radians, where f is the fundamental frequency of the transmit signal, d is the distance between the antenna elements, v is the velocity of the radiated wave, and π is the mathematic constant pi.

In certain implementations, the distance d is implemented to be about ½λ, where λ is the wavelength of the fundamental component of the transmit signal. In such implementations, the second phase shifter 130b can be controlled to provide a phase shift of about $-\pi \cos\theta$ radians to achieve a transmit beam angle θ.

Accordingly, the relative phase of the phase shifters 130a, 130b can be controlled to provide transmit beamforming. In certain implementations, a baseband modem (for example, the baseband modem 106 of FIG. 4A) and/or a transceiver (for example, the transceiver 105 of FIG. 4A) controls phase values of one or more phase shifters and gain values of one or more controllable amplifiers to control beamforming. For instance, the gain values and/or phase values can be data sent from a beam management circuit of a baseband modem. Although an example with control of phase for beamforming is shown, additional parameters (including, but not limited to, gain) can be controlled to provide beam management.

Figure 4C:
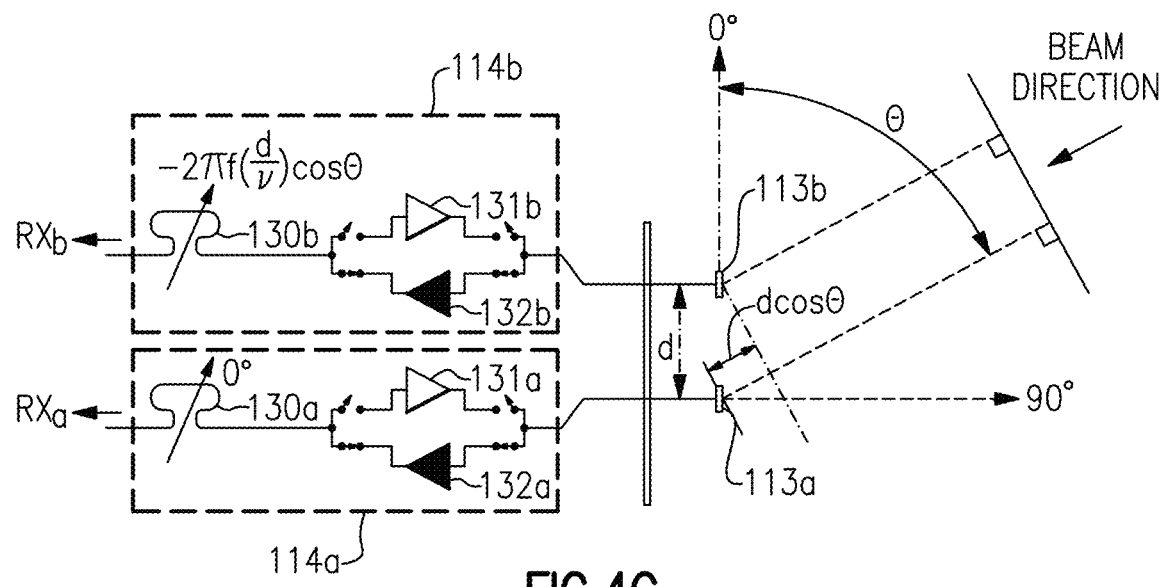
FIG. 4C is a schematic diagram of one example of beamforming to provide a receive beam.

FIG. 4C is a schematic diagram of one example of beamforming to provide a receive beam. FIG. 4C is similar to FIG. 4B, except that FIG. 4C illustrates beamforming in the context of a receive beam rather than a transmit beam.

As shown in FIG. 4C, a relative phase difference between the first phase shifter 130a and the second phase shifter 130b can be selected to about equal to $-2\pi f(d/v)\cos\theta$ radians to achieve a desired receive beam angle θ. In implementations in which the distance d corresponds to about ½λ, the phase difference can be selected to about equal to $-\pi \cos\theta$ radians to achieve a receive beam angle θ.

Although various equations for phase values to provide beamforming have been provided, other phase selection values are possible, such as phase values selected based on implementation of an antenna array, implementation of signal conditioning circuits, and/or a radio environment.

Figure 5:
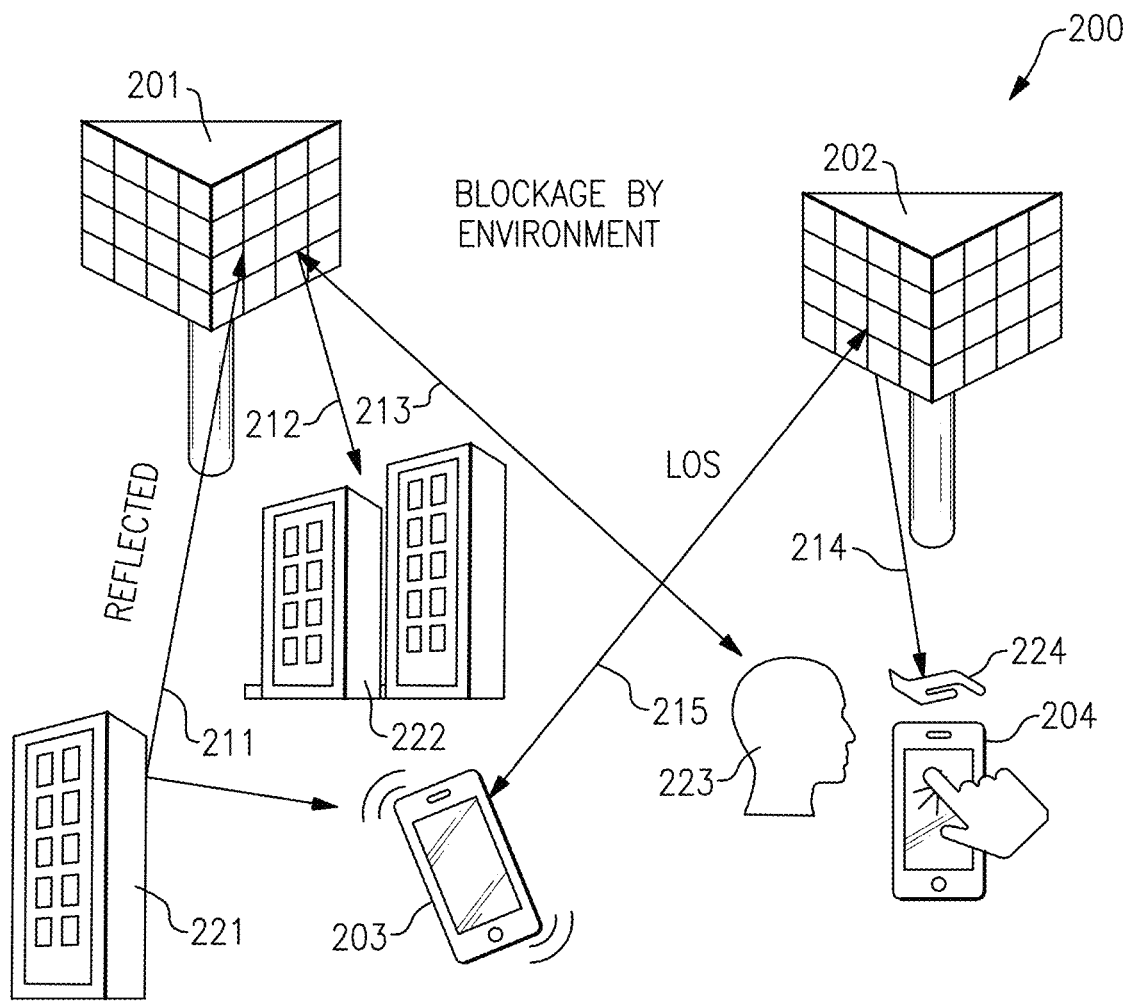
FIG. 5 is a schematic diagram illustrating various examples of environmental blockage of communication beams of a cellular network.

FIG. 5 is a schematic diagram illustrating various examples of environmental blockage of communication beams of a cellular network 200. The cellular network 200 includes a first base station 201, a second base station 202, a first mobile device 203, and a second mobile device 204, in this example. However, a cellular network can include other numbers and/or types of base stations and/or UE.

In the illustrated embodiment, transmit and receive beams are communicated between the first base station 201 and the first mobile device 203 over a reflected communication link 211. The reflected communication link 211 is also referred to herein as a quasi-line-of-sight (QLOS) communication link. In this example, a first building 221 provides reflections.

As shown in FIG. 5, a transmit beam 212 from the first base station 201 is blocked by second building 222, while a transmit beam 213 from the first base station 201 is blocked by a head 223 of a user. The building 222 and head 223 illustrate examples of objects that can provide blocking of signals having relatively high frequencies, for instance, FR2 and/or millimeter wave frequencies.

With continuing reference to FIG. 5, transmit and receive beams are communicated between the second base station 202 and the first mobile device 203 over a line-of-sight (LOS) communication link. As shown in FIG. 5, a transmit beam 214 from the second base station 202 to the second mobile device 204 is obstructed by a hand 224 of the user, and thus an LOS communication link is prevented between the second base station 202 and the second mobile device 204.

In certain implementations, beamforming from the base station side can be controlled based on three-dimensional maps and/or other known environmental data. Thus, LOS and QLOS transmit beam cases can be relatively straight forward with respect to base stations.

However, UE, such as the mobile devices 203-204 of FIG. 5, can have unpredictable blockage. For example, a user's body (for instance, head, hands, fingers, and/or limbs) can move unpredictably in short periods of time. Moreover, the user of the UE can be on foot or in a vehicle, which can lead to rapid changes in position. Furthermore, manipulation of the UE can result in unknown three-dimensional orientation and/or direction facing of the phone. The unpredictability can be exacerbated by uncertainty in the movement of other environmental objects that can suddenly cross a LOS or quasi LOS path to provide blockage.

Thus, in contrast to factors impacting beam steering at a base station that can be vary relatively slowly, factors impacting beam steering in UE can vary relatively quickly. For instance, absent satisfactory beam management, user manipulation from portrait to landscape viewing or vice versa can result in beam loss.

The teachings herein can use sensors embedded in UE for beam management. For example, the sensor data from the sensors can be used to determine UE position versus base station, UE orientation (for instance, flat, straight up, facing direction, etc.), and/or to detect potential blockage from objects, such as head, hands, and/or fingers.

Thus, information from sensors can be processed for beam management, including, but not limited to, beam discovery, tracking, and/or recovery. Furthermore, not only can sensor data be used by UE for local beam management, but can also be used by the base station via reporting from the UE.

Thus, the sensor data can be used prioritize array selection, beam direction, steering, and/or scanning. For instance, it can be used to prune some beam directions for scanning, discovery, and/or recovery. Moreover, such sensor data aids in mitigating user exposure to radiation, for instance, by meeting specific absorption rate (SAR) and/or maximum permissible exposure (MPE) limitations.

Figure 6A:
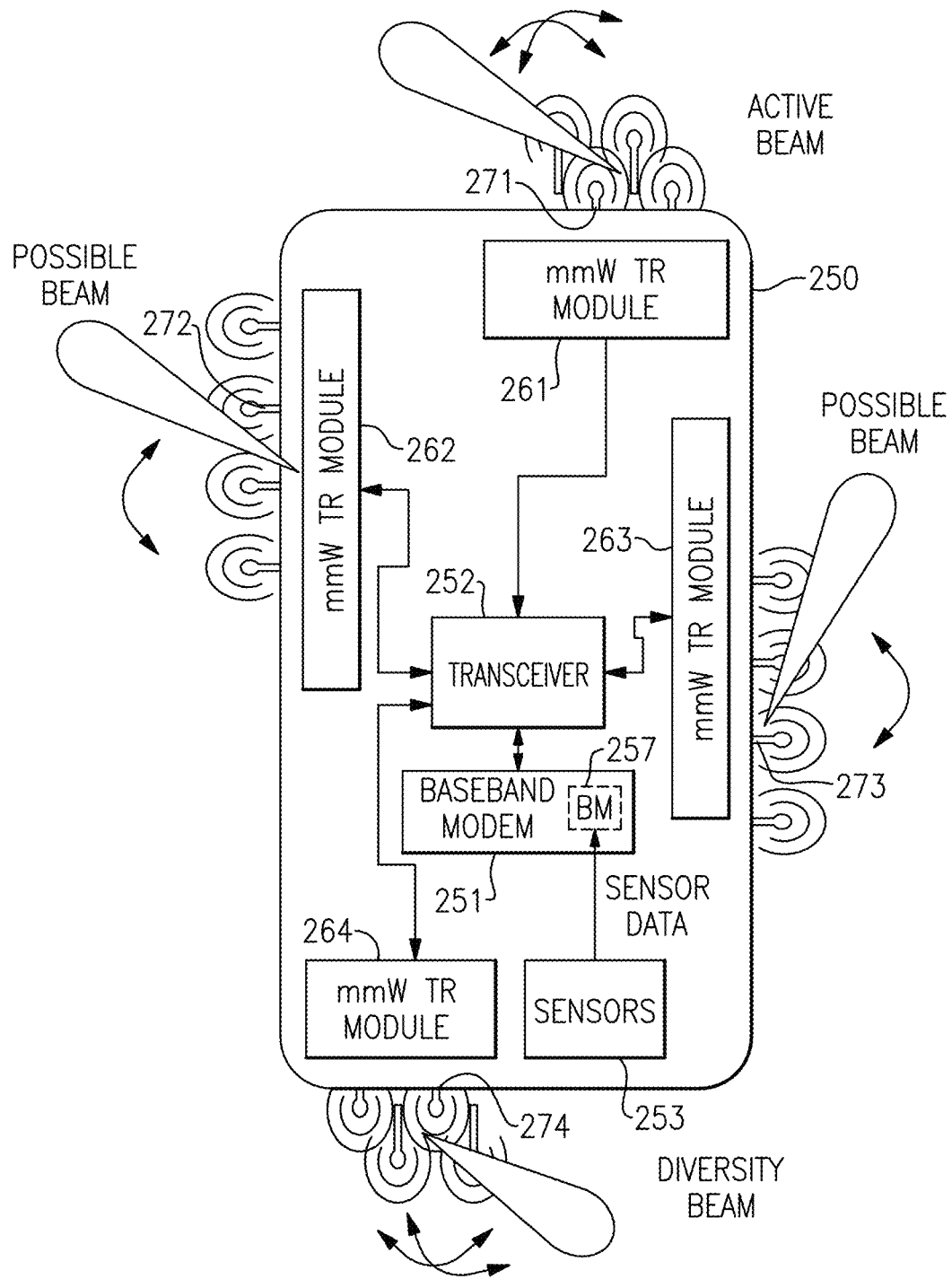
FIG. 6A is a schematic diagram of a mobile device according to one embodiment.

FIG. 6A is a schematic diagram of a mobile device 250 according to one embodiment. The mobile device 250 includes a baseband modem 251, a transceiver 252, sensors 253, a first front end module 261 (implemented as a millimeter wave transmit/receive module, in this example), a second front end module 262, a third front end module 263, a fourth front end module 264, a first antenna array 271, a second antenna array 272, a third antenna array 273, and a fourth antenna array 274. Although one embodiment of a mobile device is shown, the teachings herein are applicable to mobile devices implemented in a wide variety of ways.

As shown in FIG. 6A, the baseband modem 251 includes a beam management circuit 257 that controls beam management based on sensor data received from the sensors 253 of the mobile device 250. The sensors 253 can include a wide variety of types of sensors, including, for example, any combination of the sensors described herein.

The beam management circuit 257 controls beam management of the mobile device 250 based on the sensor data from the sensors 253. In a first example, the beam management circuit 257 controls beam steering based on the sensor data. Beam steering can include changing the angle of a transmit beam and/or receive beam to maintain connectivity between a base station and the mobile device 250.

In a second example, the beam management circuit 257 uses the sensor data to aid in beam searching, for instance, to locate a pilot beam from a base station with an efficient number of scans.

In a third example, the beam management circuit 257 uses the sensor data to select an active antenna array. For example, as shown in FIG. 6A, the first antenna array 271 is communicating using an active beam, while the second antenna array 272 and the third antenna array 274 are inactive but represent possible beams that the mobile device 250 could employ for communication.

In one example implementation, the sensors 253 operate to detect environmental blockage near one or more of the antenna arrays. Additionally, an active antenna array used for communications is selected based on sensor data from the sensors 253. For instance, the sensors 253 can include proximity sensors for detecting the presence of environmental blockage near each of the antenna arrays, with at least the antenna array with the lowest blockage used for communication.

In another example implementation, in response to the sensor data indicating a change in positioning of the mobile device 250, the beam management circuit 257 can change a front end module/antenna array that is active. For instance, the beam management circuit 257 can turn on the second front end module 262/second antenna array 272 and/or the third front end module 263/third antenna array 273 based on the sensor data. The front end modules can include signal conditioning circuits associated with the antenna elements of a corresponding array, for instance, power amplifiers, LNAs, switches, and/or other components.

In certain implementations, a mobile device includes one or more front end modules/antenna arrays used for diversity communications. For instance, the illustrated mobile device 250 includes the front end module 264 and antenna array 274 for diversity communications. The sensor data processed by the beam management circuit 257 can be used for managing a wide variety of types of beams including, but not limited to, beams used for primary communications and/or beams used for diversity communications. Accordingly, management of the diversity beam of the antenna array 274 can also be provided.

In certain implementations, the sensors 253 include at least one positioning sensor (for instance, a Global Positioning System (GPS) sensor, magnetometer, altimeter, etc.) for determining three-dimensional position, heading, and/or speed, which can be provided to the base station via another communication link, for instance, an LTE link in non-standalone (NSA) operation for a beam steering calculation. In certain implementations, the positioning data from the positioning sensors can also be used by UE in implementations in which the UE includes a three-dimensional map of base stations.

In certain implementations, data from a gyroscope and/or accelerometer is used for beam steering and/or array selection in the UE. For instance, beams pointed toward the ground or sky have relatively low likelihood of forming suitable communication links. Furthermore, in configurations in which base station position is known, the sensor data from the gyroscope and/or accelerometer can be used to control beam pointing and steering and/or to achieve beam recovery. Such beam management can be further enhanced by implementing the UE with a local three-dimensional map identifying base station locations.

The sensor data can also aid in handover operations between antenna arrays and/or beam steering as the UE (for instance, a mobile phone) is manipulated by a user.

In certain implementations, the sensors 253 include at least one proximity sensor for detecting blocking. For example, the proximity data from the proximity sensors can be used to steer beams away from blocking objects (for instance, human tissues) and/or to determine whether UE should use a secondary beam from another antenna array to connect to another base station because of such blockage.

The proximity data from the proximity sensors can also be used for controlling emissions of radiation (for instance, steering a transmit beam away from a user's head, hands, fingers, torso, and/or limbs to avoid the user's body absorbing radiation), thereby complying with limitations on SAR and/or MPE.

Proximity data can be generating using a wide variety of types of proximity sensors, including, but not limited to, time-of-flight (ToF) sensors, gesture infrared (IR) sensors, and/or cameras for generating proximity data. Furthermore, in implementations in which other antennas (for instance, sub-6 GHz antennas) are collocated with antenna arrays, antenna reflection measurements from the other antennas can used to determine if antenna array radiation is perturbed.

Moreover, antenna array radiation can also be perturbed when input cables to the UE are plugged. Thus, Universal Serial Bus (USB), audio jack, and/or other plug detection can be used to determine if radiation is perturbed. When such perturbation is detected, the UE can operate to provide compensation or correction for the perturbation and/or to change the active antenna array to thereby communicate using another beam.

In certain implementations, tactile sensors on touch screen, button, and/or fingerprint scanners can be used to determine if fingers are potentially perturbing arrays and correct for it. In the case of a touch screen sensor, blockage can further be predicted based on anticipated obstruction from swipe movements.

Figure 6B:
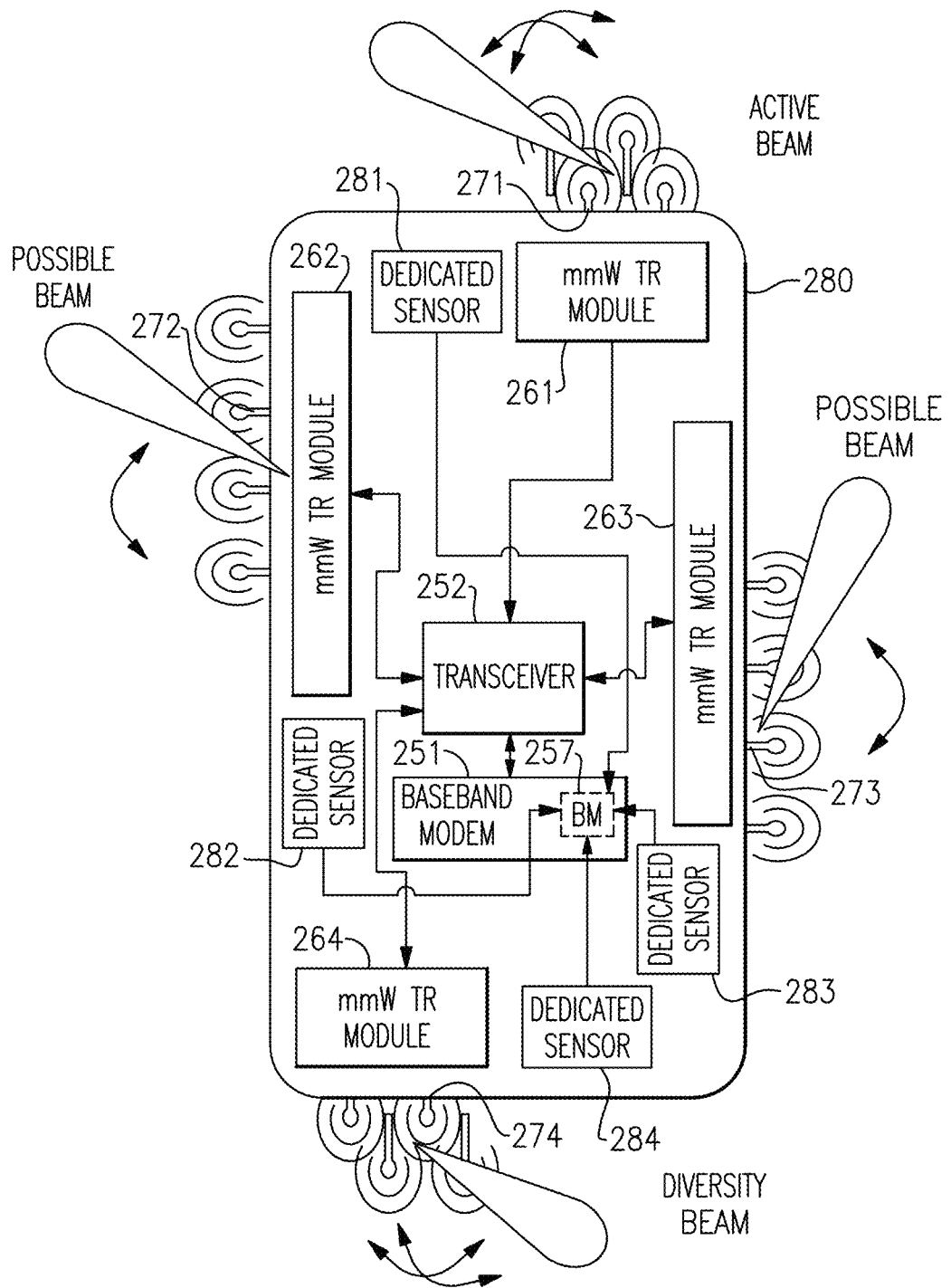
FIG. 6B is a schematic diagram of a mobile device according to another embodiment.

FIG. 6B is a schematic diagram of a mobile device 280 according to another embodiment. The mobile device 280 includes a baseband modem 251, a transceiver 252, a first front end module 261 (implemented as a millimeter wave transmit/receive module, in this example), a second front end module 262, a third front end module 263, a fourth front end module 264, a first antenna array 271, a second antenna array 272, a third antenna array 273, a fourth antenna array 274, a first dedicated sensor 281, a second dedicated sensor 282, a third dedicated sensor 283, and a fourth dedicated sensor 284. Although one embodiment of a mobile device is shown, the teachings herein are applicable to mobile devices implemented in a wide variety of ways.

The mobile device 280 of FIG. 6B is similar to the mobile device 250 of FIG. 6A, except that the mobile device 280 includes a specific implementation of sensors.

The first dedicated sensor 281 serves to detect environmental blockage of the first antenna array 271. Additionally, the second dedicated sensor 282 serves to detect environmental blockage of the second antenna array 272. Furthermore, the third dedicated sensor 283 serves to detect environmental blockage of the third antenna array 273. Additionally, the fourth dedicated sensor 284 serves to detect environmental blockage of the fourth antenna array 274.

In the illustrated embodiment, each of the dedicated sensors 281-284 corresponds to an added sensor (for instance, a proximity sensor) used for detecting the environmental blockage of a corresponding antenna array. Thus, the sensors are additional to or added to the mobile device 280 rather than an existing sensor used for other functions in the mobile device 280.

Figure 6C:
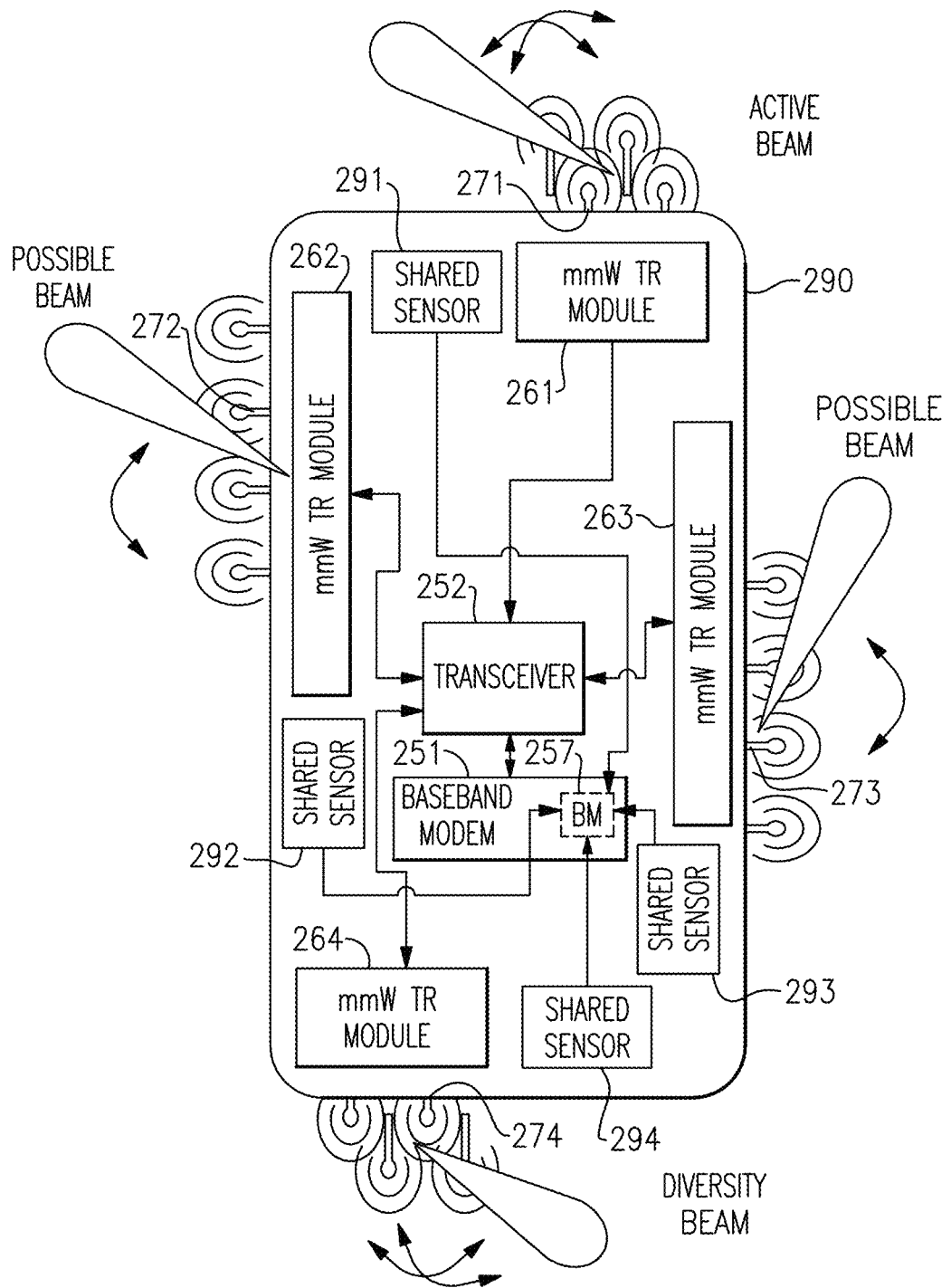
FIG. 6C is a schematic diagram of a mobile device according to another embodiment.

FIG. 6C is a schematic diagram of a mobile device 290 according to another embodiment. The mobile device 290 includes a baseband modem 251, a transceiver 252, a first front end module 261 (implemented as a millimeter wave transmit/receive module, in this example), a second front end module 262, a third front end module 263, a fourth front end module 264, a first antenna array 271, a second antenna array 272, a third antenna array 273, a fourth antenna array 274, a first shared sensor 281, a second shared sensor 282, a third shared sensor 283, and a fourth shared sensor 284. Although one embodiment of a mobile device is shown, the teachings herein are applicable to mobile devices implemented in a wide variety of ways.

The mobile device 290 of FIG. 6C is similar to the mobile device 280 of FIG. 6B, except that the mobile device 290 includes shared sensors rather than dedicated sensors.

The first shared sensor 291 serves to detect environmental blockage of the first antenna array 271. Additionally, the second shared sensor 292 serves to detect environmental blockage of the second antenna array 272. Furthermore, the third shared sensor 293 serves to detect environmental blockage of the third antenna array 273. Additionally, the fourth shared sensor 294 serves to detect environmental blockage of the fourth antenna array 274.

In the illustrated embodiment, each of the shared sensors 291-294 corresponds to a sensor used for one or more other purposes in the UE. Thus, the sensors are shared rather than additional to or added to the mobile device 290. For example, the sensors can include one or more of a time-of-flight (ToF) sensor, an infrared (IR) sensor, a front camera, a rear camera, a plug detection sensor, a touch screen sensor, a button/fingerprint sensor, an antenna reflection measurement detector, and/or other sensors serving additional functions in the mobile device 290.

The teachings herein are applicable to implementations using dedicated sensors, shared sensors, or a combination thereof.

Figure 7:
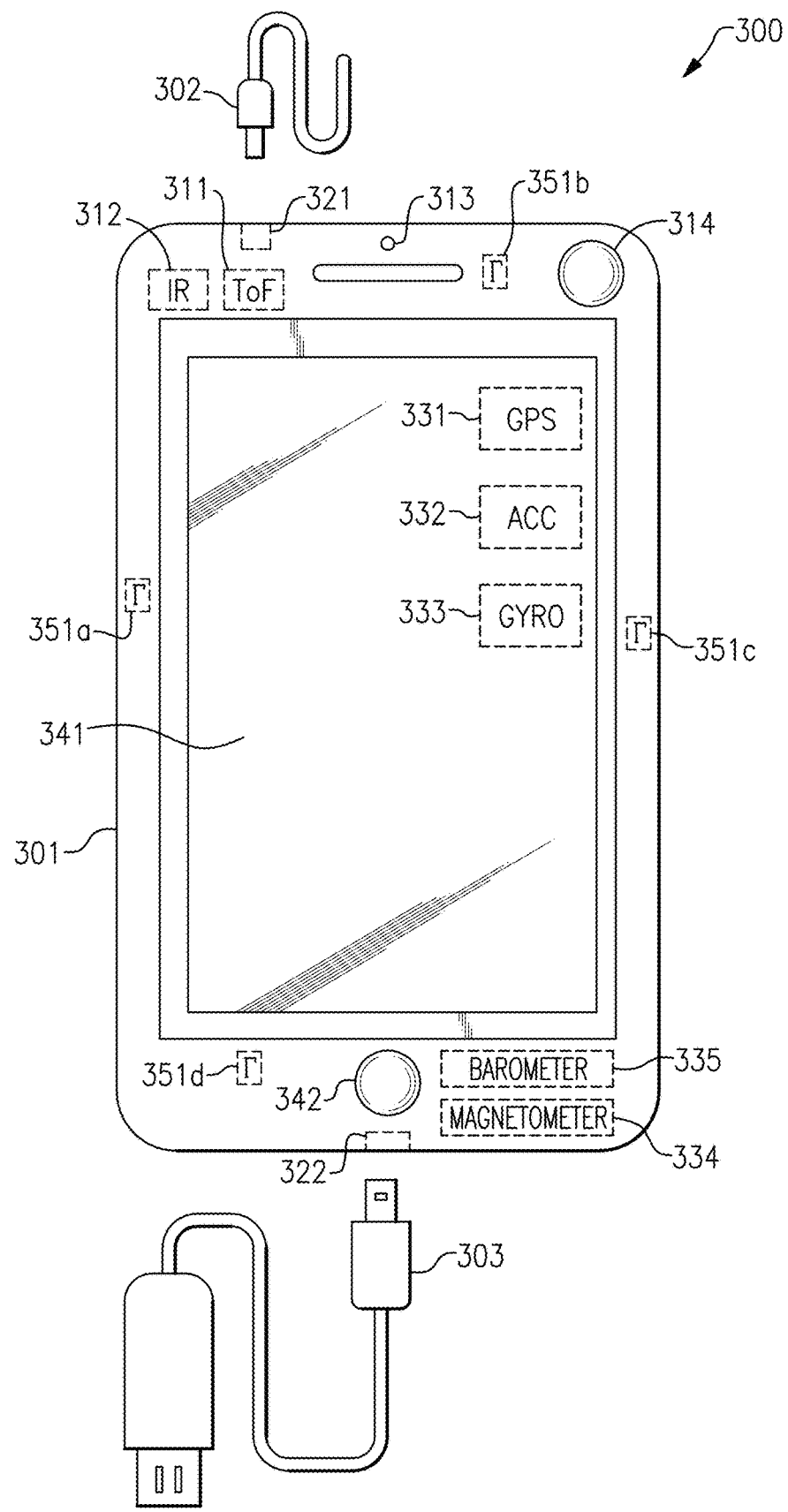
FIG. 7 is a schematic diagram of a mobile device according to another embodiment.

FIG. 7 is a schematic diagram of a mobile device 300 according to another embodiment. The mobile device 300 includes a wide variety of sensors suitable for generating sensor data for aiding beam management.

In the illustrated embodiment, the mobile device 300 includes a variety of proximity sensors, including a ToF sensor 311, an IR sensor 312, a front camera 313, and a rear camera 314. The mobile device 300 further includes a variety of plug detection sensors, such as an audio jack detector 321 and a micro USB detector 322. The mobile device 300 further includes a variety of positioning sensors, such as a GPS sensor 321, a three-dimensional accelerometer 322, a gyroscope 333, a magnetometer 334, and a barometer 335. The mobile device 300 further includes a variety of tactile sensors, such as a touch screen sensor 341 and a button/fingerprint sensor 342. The mobile device 300 further includes antenna reflection measurement detectors 351a-351d.

Although one example of sensors for a mobile device is depicted in FIG. 7, the teachings herein are applicable to a wide variety of types of sensors. Accordingly, other implementations are possible.

The ToF sensor 311 operates to detect presence of objects, such as a user's head, based on a roundtrip delay of light from departing the ToF sensor 311 to returning to the ToF sensor 311 after reflection. Thus, the image data generated by the ToF sensor 311 can be used detect the proximity of a blocking object, such as a head, a hand, and/or a finger. Likewise, the IR sensor 312 operates to shine infrared light, which can be reflected by a nearby object and picked up by the IR sensor 312.

The front camera 313 and the rear camera 314 generates image data that can be processed to the proximity of objects to the mobile device 300.

With continuing reference to FIG. 7, the mobile device 300 includes the audio jack detector 321 for detecting presence of an audio cable 302 and a micro USB detector 322 for detecting presence of a micro USB cable 303. Thus, the audio jack detector 321 and the micro USB detector 322 generate plug detection data indicating whether or not one or more plugs are connected to the mobile device 300. Since such plugs can operate to obstruct communication beams, the plug detection data can aid the mobile device 300 in beam management.

The GPS sensor 331 operates to generate GPS data indicating a GPS position of the mobile device 300. Thus, the GPS data can be used to locate a position of the mobile device 300 with respect to a GPS coordinate system.

The accelerometer 332 is used to generate acceleration data, which indicates an acceleration of the mobile device 300 relative to freefall. Thus, the accelerometer 332 can be used detect sudden motion of the mobile device 300. The acceleration data can also be used to determine the device's orientation, for instance, to determine if the mobile device 300 is in a portrait or landscape orientation and/or if the device's screen is facing upward and/or downward.

The gyroscope 333 is used to generate orientation data indicating an orientation of the mobile device 300 with relatively high precision. For example, the gyroscope can be used to determine how much the mobile device 300 has been rotated and in which direction.

The mobile device 300 of FIG. 7 also includes the magnetometer 334, which operates to detect magnetic fields. In certain implementations, the magnetometer 334 generates magnetic observation data indicating orientation of the mobile device 300 relative to Earth's magnetic field. The magnetic observation data can also be used to detect magnetic materials, such as metals.

The barometer 335 operates to sense atmospheric pressure, and thus can be used to generate pressure data indicating how high the mobile device 300 is above sea level. Thus, the pressure data can be used to detect altitude of the mobile device 300. In certain implementations, the pressure data is used in combination with the GPS data from the GPS sensor 331 to detect GPS position with enhanced accuracy.

The touch screen sensor 341 and the button/fingerprint sensor 342 operate to generate tactile data indicating presence of a finger, a hand, and/or other object. Thus, the tactile data generated from the touch screen sensor 341 and/or the button/fingerprint sensor 342 can be used to detect potential blockage of communication beams.

With continuing reference to FIG. 7, the mobile device 300 includes first to fourth antenna reflection measurement detectors 351a-351d, respectively, which operate to generate antenna reflection measurement data indicating antenna reflection of antennas of the mobile device 300. Since antenna reflection can increase when an object is nearby an antenna, the antenna reflection measurement data can be processed to detect whether or not objects are nearby the phone.

Although an example with four antenna reflection measurement detectors is shown, more or fewer antenna reflection measurement detectors can be included, for instance, based on implementation of the mobile device 300. In certain implementations, an antenna reflection measurement detector is included for a sub-6 GHz cellular and/or connectivity path that is collocated with an antenna array used for beamforming. Such antenna reflection measurement detectors can be used to detect whether or not an object is proximate to the antenna array.

Figure 8:
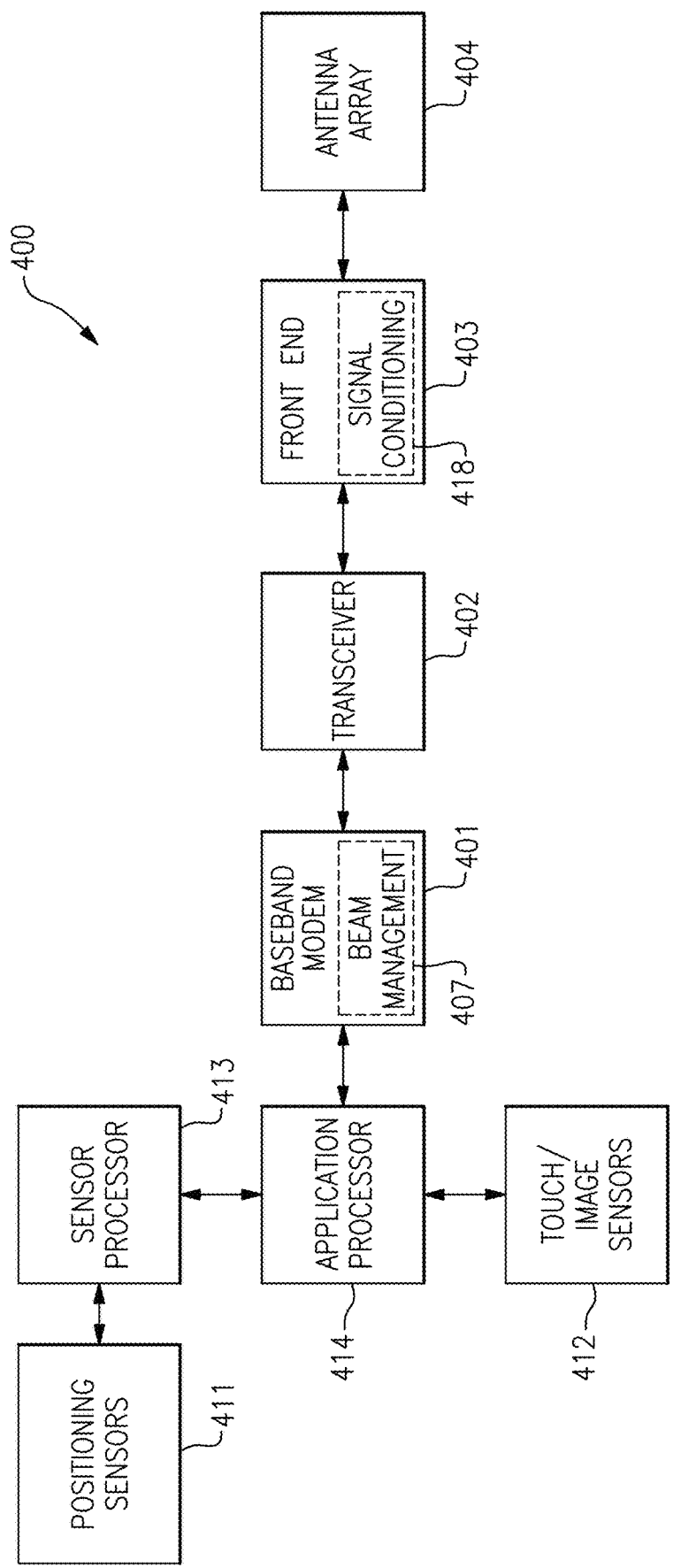
FIG. 8 is a schematic diagram of a beamforming communication system according to another embodiment.

FIG. 8 is a schematic diagram of a beamforming communication system 400 according to another embodiment. The beamforming communication system 400 includes a baseband modem 401, a transceiver 402, a front end system 403, an antenna array 404, positioning sensors 411, touch/image sensors 412, a sensor processor 413, and an application processor 414. As shown in FIG. 8, the baseband modem 401 includes a beam management circuit 407, and the front end system 403 includes signal conditioning circuitry 418.

Although one embodiment of a beamforming communication system is shown in FIG. 8, the teachings herein are applicable to beamforming communication systems implemented in a wide variety of ways. Accordingly, other implementations are possible.

The beamforming communication system 400 can be used communicate using a wide variety of communications technologies, including, but not limited to, 2G, 3G, 4G (including LTE, LTE-Advanced, and LTE-Advanced Pro), 5G NR, WLAN (for instance, Wi-Fi), WPAN (for instance, Bluetooth and ZigBee), WMAN (for instance, WiMax), and/or GPS technologies.

The transceiver 402 generates RF signals for transmission and processes incoming RF signals received from the antenna array 404. It will be understood that various functionalities associated with the transmission and receiving of RF signals can be achieved by one or more components that are collectively represented in FIG. 8 as the transceiver 802. In one example, separate components (for instance, separate circuits or dies) can be provided for handling certain types of RF signals.

The front end system 403 includes signal conditioning circuitry 418 that aids in conditioning signals transmitted to and/or received from the antenna array 404. In certain implementations, the signal conditioning circuitry 418 includes power amplifiers (PAs), low noise amplifiers (LNAs), filters, switches, phase shifters, attenuators, duplexers, diplexers, triplexers, circulators, and/or other suitable signal conditioning circuitry for processing RF signals transmitted and/or received from the antenna array 404. For example, the front end system 403 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the beamforming communication system 400 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antenna array 404 can include antennas used for a wide variety of types of communications. For example, the antenna array 404 can include antennas for transmitting and/or receiving signals associated with a wide variety of frequencies and communications standards. Although an example with one antenna array is shown, multiple antenna arrays can be included. Moreover, a selection of particular antenna array(s) that are active can be selected based on sensor data.

In certain implementations, the antenna array 404 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The beamforming communication system 400 also operates with beamforming. For example, the front end system 403 can include phase shifters having variable phase controlled by the beam management circuit 407 via the transceiver 402. In certain implementations, the front end system 403 can include variable gain amplifiers having variable gain controlled by the beam management circuit 407 via the transceiver 402.

Thus, phase shifting and/or variable gain of signal paths to the antenna array 404 are controlled to provide beam formation and directivity for transmission and/or reception of signals. For example, in the context of signal transmission, the phases of the transmit signals provided to the antenna array 404 are controlled such that radiated signals from the antenna array 404 combine using constructive and destructive interference to generate an aggregate transmit signal exhibiting beam-like qualities with more signal strength propagating in a given direction. In the context of signal reception, the phases are controlled such that more signal energy is received when the signal is arriving to the antenna array 404 from a particular direction.

The baseband modem 401 provides the transceiver 402 with digital representations of transmit signals, which the transceiver 402 processes to generate RF signals for transmission. The baseband modem 401 also processes digital representations of received signals provided by the transceiver 402.

As shown in FIG. 8, the baseband modem 401 is coupled to the application processor 414, which serves to provide primary application processing in the beamforming communication system 400. The application processor 414 can provide a wide variety of functions, such as providing system capabilities suitable for supporting applications, including, but not limited to, memory management, graphics processing, and/or multimedia decoding.

The application processor 414 receives positioning data from the positioning sensors 411 via the sensor processor 413, and touch/image data from the touch/image sensors 412. In certain implementations, the application processor 414 can provide conditioning to various sensor data prior to providing to the baseband modem 401 for beam management.

In the illustrated embodiment, the positioning sensors 411 generate positioning data with a relatively slow update rate, for instance, data indicating a new position on the order of milliseconds or seconds. The positioning data from the positioning sensors 411 is processed by the sensor processor 413, and thereafter provided to the application processor 414. Although one embodiment of processing position data is shown, other implementations are possible including, but not limited to, implementations in which the sensor processor 413 is omitted.

The touch/image sensors 412 generate touch/image data that can have a relatively fast update rate, for instance, less than a millisecond. The touch/image sensor 412 provides touch/image data to the beam management circuit 407 via the application processor 414, in this embodiment. However, other implementations are possible.

The beam management circuit 407 processes sensor data from the positioning sensors 411 and/or touch/image sensors 412 to provide beam management in accordance with the teachings herein. For example, the sensor data can be used for beam steering, beam searching, and/or a wide variety of other beam management functions.

Figure 9:
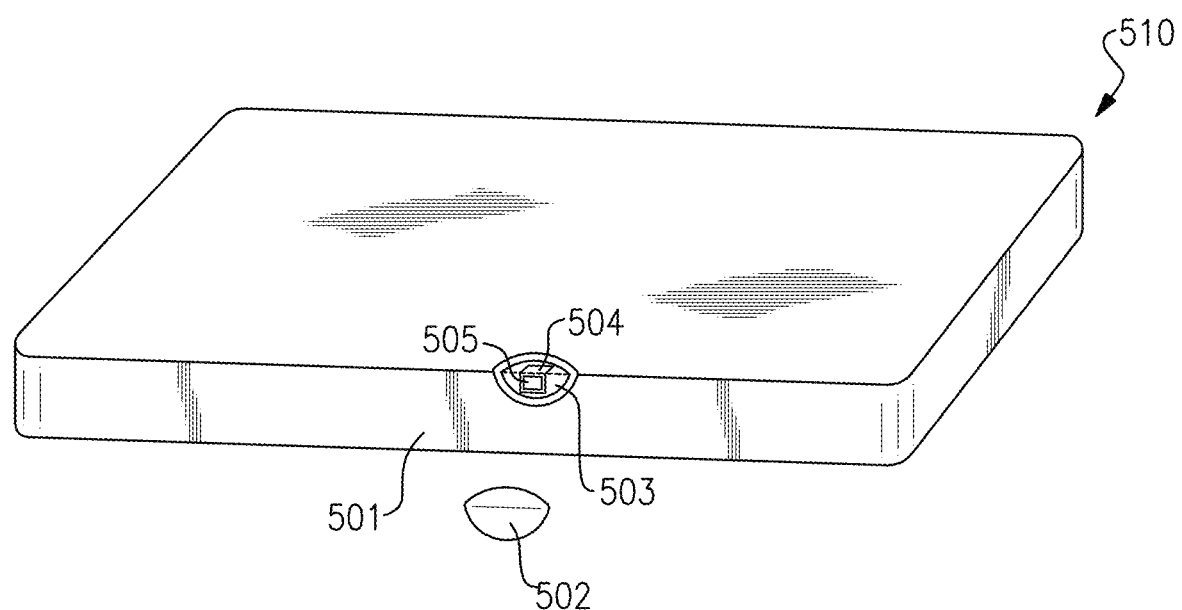
FIG. 9 is a schematic diagram of a mobile device according to another embodiment.

FIG. 9 is a schematic diagram of a mobile device 510 according to another embodiment. The mobile device 510 includes a housing or casing 501 having a cover 502 removed. The mobile device 510 further includes an underlying support structure 503 (for instance, metal) having an aperture 504 in which an RF module 505 has been provided.

The RF module 505 includes at least an antenna array. The RF module 505 can be implemented in accordance with any of the embodiments herein.

In certain implementations, multiple such RF modules are implemented around the mobile device 510, with each RF module including an antenna array. For example, the mobile device 510 can be implemented with four or more such RF modules in accordance with the embodiments of FIGS. 6A-6C.

Figure 10A:
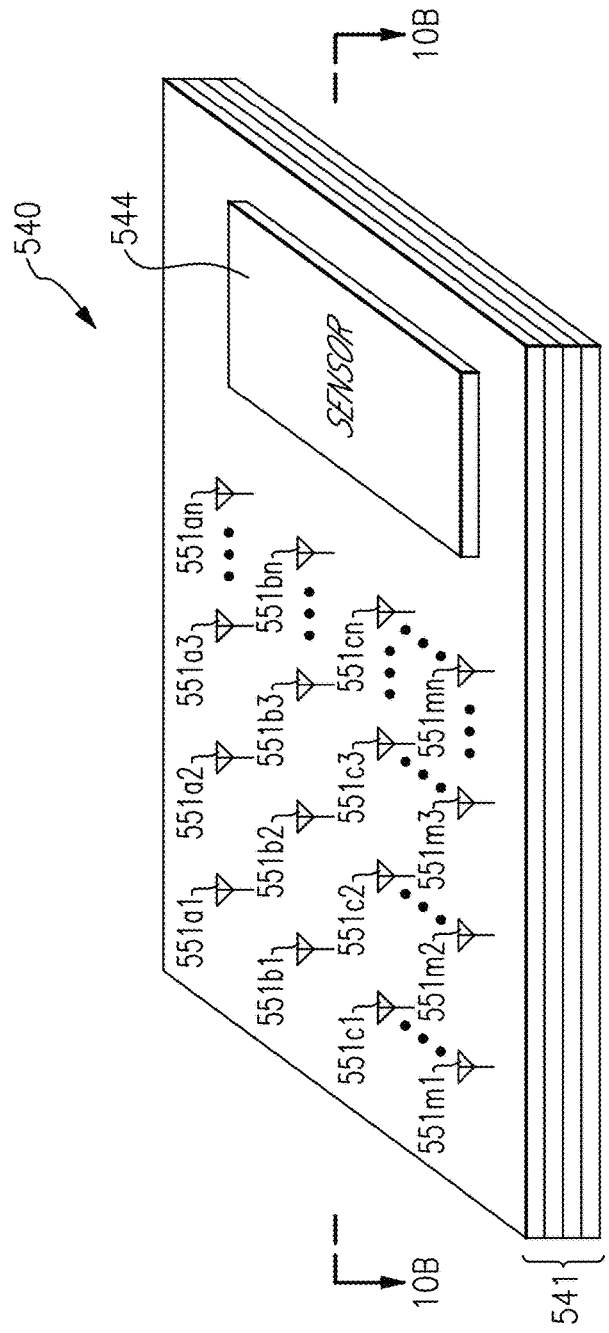
FIG. 10A is a schematic diagram of a radio frequency (RF) module according to one embodiment.
Figure 10B:
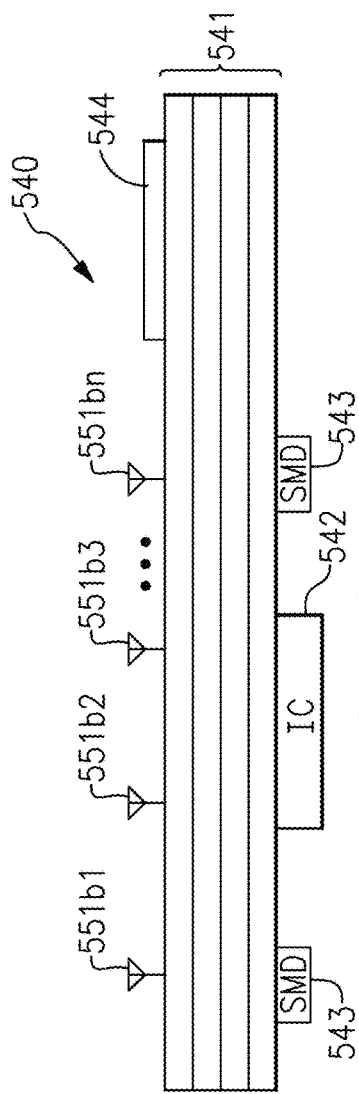
FIG. 10B is a schematic diagram of the RF module of FIG. 10A taken along the lines 10B-10B.

FIG. 10A is a schematic diagram of an RF module 540 according to one embodiment. FIG. 10B is a schematic diagram of the RF module 540 of FIG. 10A taken along the lines 10B-10B.

The module 540 includes a laminated substrate or laminate 541, a semiconductor die or IC 542 (not visible in FIG. 10A), surface mount devices (SMDs) 543 (not visible in FIG. 10A), a sensor 544, and an antenna array including antenna elements $551a1$, $551a2$, $551a3$ ... $551an$, $551b1$, $551b2$, $551b3$ ... $551bn$, $551c1$, $551c2$, $551c3$ ... $551cn$, $551m1$, $551m2$, $551m3$ ... $551mn$.

Although one embodiment of a module is shown in FIGS. 10A and 10B, the teachings herein are applicable to modules implemented in a wide variety of ways. For example, a module can include a different arrangement of and/or number of antenna elements, dies, and/or surface mount devices. Additionally, the module 540 can include additional structures and components including, but not limited to, encapsulation structures, shielding structures, and/or wirebonds.

The antenna elements antenna elements $551a1$, $551a2$, $551a3$ ... $551an$, $551b1$, $551b2$, $551b3$ ... $551bn$, $551c1$, $551c2$, $551c3$ ... $551cn$, $551m1$, $551m2$, $551m3$ ... $551mn$ are formed on a first surface of the laminate 541, and can be used to receive and/or transmit signals, based on implementation. Although a 4×4 array of antenna elements is shown, more or fewer antenna elements are possible as indicated by ellipses. Moreover, antenna elements can be arrayed in other patterns or configurations, including, for instance, arrays using non-uniform arrangements of antenna elements. Furthermore, in another embodiment, multiple antenna arrays are provided, such as separate antenna arrays for transmit and receive and/or for different communication bands.

In the illustrated embodiment, the IC 542 is on a second surface of the laminate 541 opposite the first surface. However, other implementations are possible. In one example, the IC 542 is integrated internally to the laminate 541.

In certain implementations, the IC 542 includes signal conditioning circuits associated with the antenna elements $551a1$, $551a2$, $551a3$ ... $551an$, $551b1$, $551b2$, $551b3$ ... $551bn$, $551c1$, $551c2$, $551c3$ ... $551cn$, $551m1$, $551m2$, $551m3$ ... $551mn$. In one embodiment, the IC 542 includes a serial interface, such as a mobile industry processor interface radio frequency front-end (MIPI RFFE) bus and/or inter-integrated circuit ($I_2C$) bus that receives data for controlling the signal conditioning circuits, such as the amount of phase shifting provided by phase shifters. In another embodiment, the IC 142 includes signal conditioning circuits associated with the antenna elements $551a1$, $551a2$, $551a3$ ... $551an$, $551b1$, $551b2$, $551b3$ ... $551bn$, $551c1$, $551c2$, $551c3$ ... $551cn$, $551m1$, $551m2$, $551m3$ ... $551mn$ and an integrated transceiver, baseband modem, and/or beam management circuit.

The laminate 541 can include various structures including, for example, conductive layers, dielectric layers, and/or solder masks. The number of layers, layer thicknesses, and materials used to form the layers can be selected based on a wide variety of factors, and can vary with application and/or implementation. The laminate 541 can include vias for providing electrical connections to signal feeds and/or ground feeds of the antenna elements. For example, in certain implementations, vias can aid in providing electrical connections between signal conditioning circuits of the IC 542 and corresponding antenna elements.

The antenna elements 551a1, 551a2, 551a3 . . . 551a*n*, 551b1, 551b2, 551b3 . . . 551b*n*, 551c1, 551c2, 551c3 . . . 551c*n*, 551m1, 551m2, 551m3 . . . 551m*n* can correspond to antenna elements implemented in a wide variety of ways. In one example, the array of antenna elements includes patch antenna element formed from a patterned conductive layer on the first side of the laminate 541, with a ground plane formed using a conductive layer on opposing side of the laminate 541 or internal to the laminate 541. Other examples of antenna elements include, but are not limited to, dipole antenna elements, ceramic resonators, stamped metal antennas, and/or laser direct structuring antennas.

In the illustrated embodiment, the sensor 544 is attached to a side of the laminate 541 opposite the IC 542. However, other implementations are possible. The sensor 544 generates sensor data used to control beamforming on the antenna array.

The module 540 can be included a communication system, such as a mobile phone or base station. In one example, the module 540 is attached to a phone board of a mobile phone.

Figure 11A:
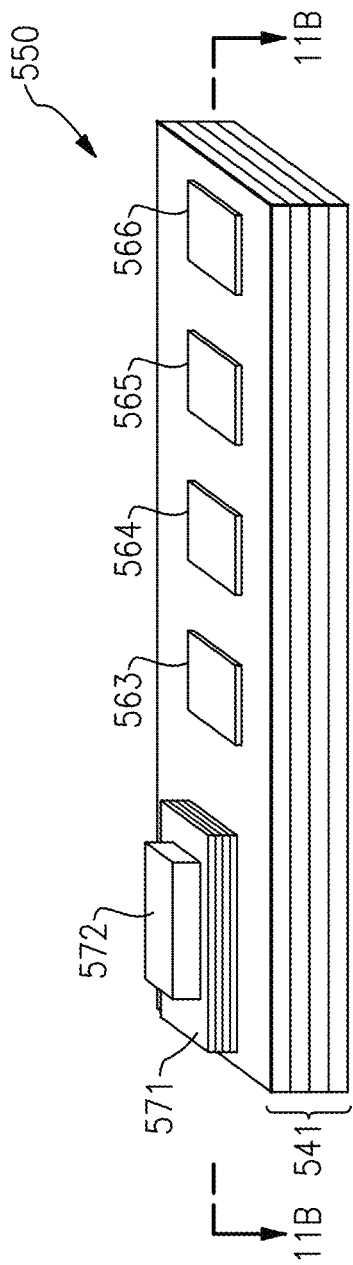
FIG. 11A is a schematic diagram of an RF module according to another embodiment.
Figure 11B:
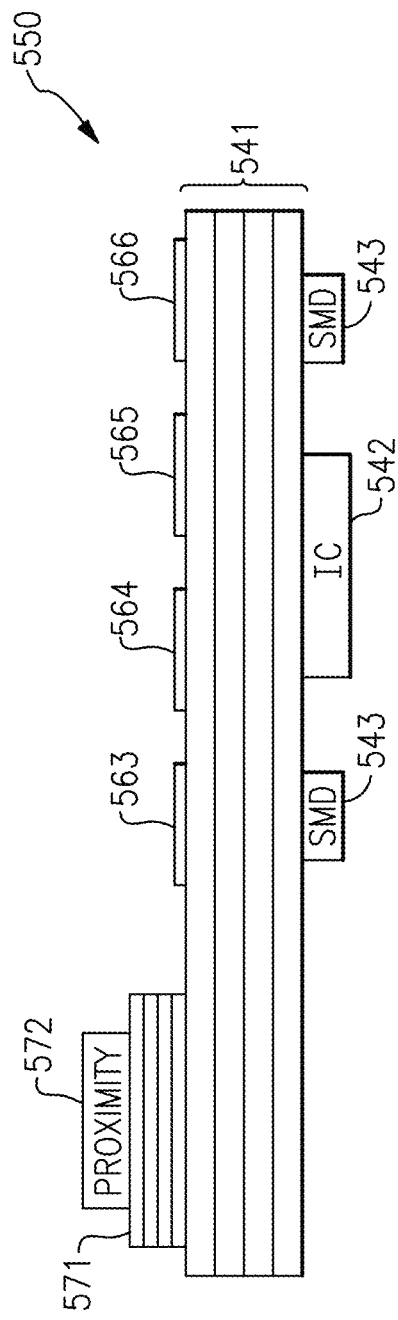
FIG. 11B is a schematic diagram of the RF module of FIG. 11A taken along the lines 11B-11B.

FIG. 11A is a schematic diagram of an RF module 550 according to another embodiment. FIG. 11B is a schematic diagram of the RF module 550 of FIG. 11A taken along the lines 11B-11B.

The RF module 550 includes a first laminated substrate 541, an IC 542 (not visible in FIG. 11A), SMDs 543 (not visible in FIG. 11A), first patch antenna element(s) (for instance, a patch antenna element or an array of patch antenna elements) 563, second patch antenna element(s) 564, third patch antenna element(s) 565, and fourth patch antenna element(s) 566. The RF module 550 further includes a proximity sensor 572 attached to a second laminated substrate 542, which in turn is attached to the first laminated substrate 541. In certain implementations, the first laminated substrate 541 and the second laminated substrate 542 are each a printed circuit board (PCB).

Additional details of the RF module 550 can be similar to those of the RF module 540 of FIGS. 10A and 10B.

Applications

The principles and advantages of the embodiments described herein can be used for a wide variety of applications.

For example, various electronic devices can operate with beam management based on sensor data. For instance, a beam management circuit that operates based on sensor data can be included in various electronic devices, including, but not limited to consumer electronic products, parts of the consumer electronic products, electronic test equipment, etc. Example electronic devices include, but are not limited to, a base station, a wireless network access point, a mobile phone (for instance, a smartphone), a tablet, a television, a computer monitor, a computer, a hand-held computer, a personal digital assistant (PDA), a microwave, a refrigerator, an automobile, a stereo system, a disc player, a digital camera, a portable memory chip, a washer, a dryer, a copier, a facsimile machine, a scanner, a multi-functional peripheral device, a wrist watch, a clock, etc. Further, the electronic devices can include unfinished products.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A mobile device comprising:
   a laminated substrate;
   a first antenna array including a plurality of antenna elements arranged in an array of at least four elements by at least four elements on a first side of the substrate;
   a first sensor, the first sensor being a tactile sensor configured to generate sensor data in response to a user touching a touch screen of the mobile device;
   an integrated circuit die supported on a second side of the substrate opposite the first side and including signal conditioning circuitry electrically connected to the first antenna array and configured to condition a plurality of radio frequency signals each transmitted by a corresponding one of the plurality of antenna elements to thereby form a transmit beam; and
   a beam management circuit configured to, based on the sensor data generated by the tactile sensor in response to the user touching the surface of the mobile device, predict an environmental blockage based on an anticipated finger swipe movement and control the signal conditioning circuitry to manage the transmit beam formed by the plurality of antenna elements of the first antenna array, and to adjust an angle of the transmit beam based on at least a transmit signal fundamental frequency and distance between antenna elements in the plurality of antenna elements, the beam management circuit further configured to process the sensor data to move the transmit beam away from the environmental blockage predicted based on the anticipated finger swipe.

2. The mobile device of claim 1 wherein the beam management circuit is configured to steer the transmit beam based on the sensor data.

3. The mobile device of claim 1 wherein the beam management circuit is configured to process the sensor data to maintain the transmit beam pointed at a base station.

4. The mobile device of claim 1 further comprising a second antenna array, the beam management circuit configured to disable the first antenna array and to transmit using the second antenna array in response to determining that the sensor data indicates environmental blockage of the first antenna array.

5. The mobile device of claim 4 further comprising a second sensor configured to detect environmental blockage of the second antenna array.

6. The mobile device of claim 1 wherein the beam management circuit is configured to control transmission of at least a portion of the sensor data to a base station.

7. The mobile device of claim 1 further comprising a second sensor that is an accelerometer.

8. The mobile device of claim 1 further comprising a second sensor that is a plug detection sensor.

9. The mobile device of claim 1 further comprising a second sensor that is a time-of-flight sensor, an infrared sensor, or a camera.

10. The mobile device of claim 1 further comprising a second sensor that is an antenna reflection measurement detector.

11. The mobile device of claim 1 further comprising an application processor and a baseband modem, the baseband modem including the beam management circuit, the beam management circuit configured to receive the sensor data via the application processor.

12. A method of beam management in a mobile device, the method comprising:
    conditioning a plurality of radio frequency signals using signal conditioning circuitry implemented in an integrated circuit die on a first side of a laminated substrate;
    transmitting each of the plurality of radio frequency signals on a corresponding one of a plurality of antenna elements of a first antenna array to form a transmit beam, the plurality of antenna elements arranged in an array of at least four elements by at least four elements on a second side of the laminated substrate opposite the first side;
    generating sensor data using a tactile sensor in response to a user touching a touch screen of the mobile device;
    based on the sensor data generated by the tactile sensor in response to the user touching the surface of the mobile device predicting a blockage based on an anticipated finger swipe movement and controlling the signal conditioning circuitry to manage the transmit beam formed by the plurality of antenna elements of the first antenna array;
    adjusting an angle of the transmit beam based on at least a transmit signal fundamental frequency and distance between antenna elements in the plurality of antenna elements; and
    processing the sensor data to move the transmit beam away from the environmental blockage predicted based on the anticipated finger swipe.

13. The method of claim 12 further comprising steering the transmit beam based on the sensor data.

14. The method of claim 13 further comprising processing the sensor data to maintain the transmit beam pointed at a base station.

15. The method of claim 12 further comprising transmitting using a second antenna array in response to determining that the sensor data indicates environmental blockage of the first antenna array.

16. A radio frequency module for a mobile device, the radio frequency module comprising:
    a laminated substrate;
    an antenna array including plurality of antenna elements arranged in an array of at least four elements by at least four elements on a first side of the substrate, and configured to radiate a transmit beam in response to receiving a plurality of radio frequency signals;
    a tactile sensor configured to generate sensor data in response to a user touching a touch screen of the mobile device; and
    a semiconductor die supported on a second side of the substrate opposite the first side and including signal conditioning circuitry configured to condition the plurality of radio frequency signals, and a beam management circuit configured to, based on the sensor data generated by the tactile sensor in response to the user touching the surface of the mobile device, predict an environmental blockage based on an anticipated finger swipe movement, and to adjust an angle of the transmit beam based on at least a transmit signal fundamental frequency and distance between antenna elements in the plurality of antenna elements, the beam management circuit further configured to process the sensor data to move the transmit beam away from the environmental blockage predicted based on the anticipated finger swipe.

* * * * *